(12) United States Patent
Nishio et al.

(10) Patent No.: US 11,092,305 B2
(45) Date of Patent: Aug. 17, 2021

(54) ILLUMINATION DEVICE

(71) Applicant: Dai Nippon Printing Co., Ltd., Tokyo (JP)

(72) Inventors: Shumpei Nishio, Tokyo (JP); Makio Kurashige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/609,556

(22) PCT Filed: May 18, 2018

(86) PCT No.: PCT/JP2018/019262
§ 371 (c)(1),
(2) Date: Oct. 30, 2019

(87) PCT Pub. No.: WO2018/216609
PCT Pub. Date: Nov. 29, 2018

(65) Prior Publication Data
US 2020/0063933 A1    Feb. 27, 2020

(30) Foreign Application Priority Data

May 22, 2017  (JP) .............................. JP2017-101101

(51) Int. Cl.
*G03H 1/32* (2006.01)
*F21S 41/16* (2018.01)
(Continued)

(52) U.S. Cl.
CPC ............. *F21S 41/16* (2018.01); *F21S 41/285* (2018.01); *F21S 41/40* (2018.01); *F21S 41/675* (2018.01); *G02B 5/32* (2013.01); *F21W 2102/135* (2018.01)

(58) Field of Classification Search
CPC .............. B60Q 1/06; B60Q 1/16; F21S 41/16
See application file for complete search history.

(56) References Cited

U.S. PATENT DOCUMENTS 4,477,184 A * 10/1984 Endo ...................... G01S 17/931
356/141.1
5,323,302 A    6/1994 Bertling et al.
(Continued)

FOREIGN PATENT DOCUMENTS

DE    42 15 584 A1    11/1993
EP    0 660 139 A1    6/1995
(Continued)

OTHER PUBLICATIONS

English translation of International Preliminary Report on Patentability (Chapter I) (Application No. PCT/JP2018/019262) dated Dec. 5, 2019, 7 pages.
(Continued)

*Primary Examiner* — Andrew J Coughlin
(74) *Attorney, Agent, or Firm* — Burr & Brown, PLLC

(57) ABSTRACT

A coherent light beam from a light source is scanned by a scanning member and is incident to a light receiving surface of a light diffusing element. The incident light beam is emitted as diffused light, passes through an illumination optical system, and forms a drawing spot on an illumination target surface. When a scan control unit controls scanning of the light beam, an illumination area is formed by the moving drawing spot on the illumination target surface.

18 Claims, 13 Drawing Sheets

(51) Int. Cl.
*F21S 41/675* (2018.01)
*F21S 41/40* (2018.01)
*F21S 41/20* (2018.01)
*G02B 5/32* (2006.01)
*F21W 102/135* (2018.01)

(56) References Cited

U.S. PATENT DOCUMENTS

| | | | | |
|---|---|---|---|---|
| 10,520,157 | B2* | 12/2019 | Zozgornik | G02B 5/32 |
| 2013/0170007 | A1 | 7/2013 | Kurashige et al. | |
| 2014/0254188 | A1* | 9/2014 | Masuda | F21S 41/675 |
| | | | | 362/521 |
| 2016/0313567 | A1* | 10/2016 | Kurashige | G03B 21/2033 |
| 2017/0030544 | A1* | 2/2017 | Tsuda | G02B 26/0808 |
| 2017/0334341 | A1 | 11/2017 | Kurashige et al. | |
| 2020/0088379 | A1* | 3/2020 | Kurashige | F21S 43/26 |

FOREIGN PATENT DOCUMENTS

| | | |
|---|---|---|
| EP | 2 985 524 A1 | 2/2016 |
| JP | 2012-146621 A1 | 8/2012 |
| JP | 2015-132707 A1 | 7/2015 |
| JP | 2015-212824 A1 | 11/2015 |
| JP | 2016-029488 A1 | 3/2016 |
| JP | 2016-135629 A1 | 7/2016 |
| WO | 2016/072505 A1 | 5/2016 |

OTHER PUBLICATIONS

Extended European Search Report (Application No. 18806189.9) dated Jan. 15, 2021.
International Search Report and Written Opinion (Application No. PCT/JP2018/019262) dated Jul. 17, 2018.
Chinese Office Action (Application No. 201880033300.6) dated Mar. 12, 2021 (with English translation).

* cited by examiner (a)

(b)

ILLUMINATION DEVICE

TECHNICAL FIELD

The present invention relates to an illumination device, and more particularly, to an illumination device that performs illumination by forming an illumination area having a predetermined shape on a predetermined illumination target surface.

BACKGROUND ART

Conventionally, illumination devices using laser light sources have been proposed. In general, a laser light source has a smaller light emitting area than a light emitting diode (LED) and can emit coherent light with high directivity, and thus, has an advantage that light can be delivered far away. Meanwhile, an illumination device using the laser light source has a problem that a speckle is generated due to mutual interference of coherent light reflected from each part of a light diffusing surface when performing illumination on the light diffusion surface. In addition, there is also a problem that the speckle generated on the laser light source side causes uneven illuminance distribution on the illumination target surface in a far-field irradiation application.

Recently, illumination devices, which are mounted on vehicles such as a car and emit illumination light from laser light sources to a road surface, have also been proposed. For example, the following Patent Literature 1 discloses a vehicular lighting device that includes a light source that emits coherent light and a holographic optical element that reproduces a predetermined image by the coherent light. In addition, Patent Literature 2 discloses an in-vehicle illumination device that irradiates a transmissive holographic optical element with laser light emitted from a laser light source and forms a desired illumination pattern on a road surface.

Since a desired diffraction pattern (interference fringe pattern) can be recorded in advance in the holographic optical element, it is possible to form an illumination pattern having a desired shape on the road surface. That is, when light is incident on the holographic optical element from a predetermined direction, diffracted light is emitted is emitted in a direction according to the recorded diffraction pattern, and a predetermined position on the illumination target surface can be illuminated with the emitted diffracted light according to the desired illumination pattern.

CITATION LIST

Patent Literature

Patent Literature 1: JP 2012-146621 A
Patent Literature 2: JP 2015-132707 A

SUMMARY OF INVENTION

Technical Problem

As described above, the laser light has higher coherence than non-coherent light such as LED light, and thus, the clear illumination pattern can be formed on the illumination target surface in principle. In practice, however, blurring occurs in the illumination pattern (illumination area having a predetermined shape) formed on the illumination target surface due to a beam diameter of the laser light emitted from the laser light source or the like. Specifically, a boundary portion of the illumination area forming the illumination pattern becomes unclear. In particular, when used for the purpose of projecting the illumination pattern on a distant road surface, the blurring of the illumination pattern formed on the road surface becomes a level that is not ignorable. Thus, it is difficult to display the illumination pattern that requires high resolution, such as a character and a sign mark.

In addition, laser light has a much higher radiance than non-coherent light such as LED light, and thus, some safety measures are required in an illumination device using a laser light source in order to prevent human eyes from being damaged by the laser light. In the illumination devices using the laser light sources disclosed in Patent Literatures 1 and 2 described above, safety measures for such occurrence of blurring and the laser light are not sufficiently taken.

Therefore, an object of the present invention is to provide an illumination device capable of forming a clear illumination area with suppressed blurring on an illumination target surface while securing safety for coherent light.

Solution to Problem (1) A first aspect of the present invention is an illumination device that forms an illumination area having a predetermined shape on a predetermined illumination target surface to perform illumination, the illumination device provided with a light source that emits a coherent light beam; a scanning member that scans the light beam; a light diffusing element that receives a scanning beam scanned by the scanning member and diffuses the scanning beam and emits diffused light; an illumination optical system that guides the diffused light to the illumination target surface; and a scan control unit that controls scanning of the scanning member such that an incident point of the scanning beam to the light diffusing element draws a predetermined locus, wherein, when a first diffusion axis and a second diffusion axis are defined on a light emitting surface of the light diffusing element, the light diffusing element performs anisotropic diffusion such that an extent of spread of diffused light in a direction of the first diffusion axis is different from an extent of spread of diffused light in a direction of the second diffusion axis, the diffused light obtained by the anisotropic diffusion is caused to pass through the illumination optical system and form a drawing spot on the illumination target surface at each scanning time point, and drawing is performed by moving the drawing spot on the illumination target surface to form the illumination area having the predetermined shape under control of the scan control unit.

(2) A second aspect of the present invention is the illumination device according to the first aspect described above, wherein the first diffusion axis and the second diffusion axis are axes orthogonal to each other, and a cross section of the diffused light cut along a plane orthogonal to a central axis of the diffused light is rectangular.

(3) A third aspect of the present invention is the illumination device according to the second aspect described above, wherein, when an XYZ three-dimensional orthogonal coordinate system is defined, the illumination target surface is set on an XY plane, the light emitting surface of the light diffusing element is located on a plane parallel to an XZ plane, the first diffusion axis is parallel to an X axis, the second diffusion axis is parallel to a Z axis, and the light diffusing element performs anisotropic diffusion such that the diffused light emitted from the light emitting surface of the light diffusing element is directed toward the illumination target surface and a cross section when the diffused light is cut along a plane orthogonal to a central axis of the diffused light forms a rectangle having two sides parallel to the X axis as long sides and the other two sides as short sides.

(4) A fourth aspect of the present invention is the illumination device according to the second aspect described above, wherein, when an XYZ three-dimensional orthogonal coordinate system and a Z' axis, obtained by rotating a Z axis by a predetermined tilt angle (ξ) with an X axis as a rotation axis, is defined, the illumination target surface is set on an XY plane, the light emitting surface of the light diffusing element is located on a plane parallel to an XZ' plane, the first diffusion axis is parallel to an X axis, and the second diffusion axis is parallel to a Z' axis, and the light diffusing element performs anisotropic diffusion such that the diffused light emitted from the light emitting surface of the light diffusing element is directed toward the illumination target surface and a cross section when the diffused light is cut along a plane parallel to the XZ' plane forms a rectangle having two sides parallel to the X axis as long sides and two sides parallel to the Z' axis as short sides.

(5) A fifth aspect of the present invention is the illumination device according to the first aspect described above, wherein the light diffusing element is configured using a diffractive optical element or a holographic optical element, when incident light having a predetermined incident angle is applied, a diffraction grating or an interference fringe is recorded in each portion of the light diffusing element such that diffracted light having an angular spatial distribution of a predetermined first-order diffracted light intensity is emitted as the diffused light, and when a displacement angle of diffracted light with respect to incident light at a predetermined incident point is expressed by a first direction displacement angle indicating a displacement in a direction of the first diffusion axis and a second direction displacement angle indicating a displacement in a direction of the second diffusion axis and a distribution graph having the first direction displacement angle as an abscissa axis, the second direction displacement angle as an ordinate axis, and a point at which the first direction displacement angle=0 and the second direction displacement angle=0 as an origin is defined, the angular spatial distribution of the first-order diffracted light intensity is expressed by a diffracted light distribution area formed of a horizontally long rectangle that is bilaterally symmetrical with the ordinate axis as a symmetry axis on the distribution graph.

(6) A sixth aspect of the present invention is the illumination device according to the fifth aspect described above, wherein, when an XYZ three-dimensional orthogonal coordinate system is defined, the illumination target surface is set on an XY plane, the light emitting surface of the light diffusing element is located on a plane parallel to an XZ plane, the first diffusion axis is parallel to an X axis, and the second diffusion axis is parallel to a Z axis, and an angular spatial distribution of a first-order diffracted light intensity for each portion of the light diffusing element is expressed by a diffracted light distribution area formed of a horizontally long rectangle, arranged at a position which has a predetermined ordinate value such that the diffused light is directed to the illumination target surface with an ordinate axis as a center, on a distribution graph.

(7) A seventh aspect of the present invention is the illumination device according to the fifth aspect described above, wherein, when an XYZ three-dimensional orthogonal coordinate system is defined and a Z' axis, obtained by rotating a Z axis by a predetermined tilt angle with an X axis as a rotation axis, is defined, the illumination target surface is set on an XY plane, the light emitting surface of the light diffusing element is located on a plane parallel to an XZ' plane, the first diffusion axis is parallel to the X axis, and the second diffusion axis is parallel to the Z' axis, and an angular spatial distribution of a first-order diffracted light intensity for each portion of the light diffusing element is expressed by a diffracted light distribution area formed of a horizontally long rectangle, arranged with an origin as a center, on a distribution graph.

(8) An eighth aspect of the present invention is the illumination device according to the seventh aspect described above, wherein the light diffusing element is configured using a diffractive optical element in which a diffraction grating with multiple grid lines parallel to the Z' axis arranged at a plurality of pitches is recorded in a physical structure.

(9) A ninth aspect of the present invention is the illumination device according to the fifth to seventh aspects described above, wherein the light diffusing element is configured using a holographic optical element in which each portion generates a reproduction image of a rectangular surface at a predetermined position.

(10) A tenth aspect of the present invention is the illumination device according to the fifth to seventh aspects described above, wherein the light diffusing element is a holographic optical element having a plurality of elemental diffractive optical areas, independent individual holograms are recorded respectively in the plurality of elemental diffractive optical areas, and the individual holograms have functions of emitting diffused light that forms separate drawing spots at individual positions, respectively, on the illumination target surface through the illumination optical system when receiving the scanning beam from the scanning member.

(11) An eleventh aspect of the present invention is the illumination device according to the ninth or tenth aspect described above, wherein the light diffusing element is a holographic optical element in which a CGH having an interference fringe obtained by calculation using a computer is recorded in a physical structure.

(12) A twelfth aspect of the present invention is the illumination device according to the first aspect described above, wherein, when a virtual projection plane orthogonal to an optical axis of the illumination optical system is defined at a front surface position of the illumination optical system, the diffused light from the light diffusing element forms a rectangular diffused light spot having a pair of long sides and a pair of short sides on the virtual projection plane at each scanning time point.

(13) A thirteenth aspect of the present invention is the illumination device according to the twelfth aspect described above, wherein, when an XYZ three-dimensional orthogonal coordinate system is defined, the illumination target surface is set on an XY plane, the light emitting surface of the light diffusing element is located on a plane parallel to an XZ plane, the optical axis of the illumination optical system is parallel to a central axis of the diffused light emitted from a predetermined point on the light emitting surface of the light diffusing element, the first diffusion axis is parallel to an X axis, and the second diffusion axis is parallel to a Z axis, and when the virtual projection plane orthogonal to the optical axis of the illumination optical system is defined at the front surface position of the illumination optical system, the diffused light from the light diffusing element forms the rectangular diffused light spot having a pair of long sides parallel to an X axis and short sides formed of the other pair of sides on the virtual projection plane at each scanning time point.

(14) A fourteenth aspect of the present invention is the illumination device according to the twelfth aspect described above, wherein, when an XYZ three-dimensional orthogonal coordinate system is defined and a Z' axis, obtained by rotating a Z axis by a predetermined tilt angle with an X axis as a rotation axis, is defined, the illumination target surface is set on an XY plane, the light emitting surface of the light diffusing element is located on a plane parallel to an XZ' plane, the optical axis of the illumination optical system is orthogonal to the XZ' plane, the first diffusion axis is parallel to the X axis, and the second diffusion axis is parallel to the Z' axis, and when a virtual projection plane (M) parallel to the XZ' plane is defined at the front surface position of the illumination optical system, the diffused light from the light diffusing element forms the rectangular diffused light spot having a pair of long sides parallel to an X axis and a pair of short sides parallel to the Z' axis on the virtual projection plane at each scanning time point.

(15) A fifteenth aspect of the present invention is the illumination device according to the first to fourteenth aspects described above, wherein the illumination optical system is configured using a collimator lens, and the light emitting surface of the light diffusing element is arranged at a front focal position of the collimator lens.

(16) A sixteenth aspect of the present invention is the illumination device according to the first to fifteenth aspects described above, wherein the scanning member includes: a transmission scanning body that emits light incident on a first surface from a second surface; and a scanning mechanism that rotates the transmission scanning body about two axes to perform scanning, the light beam from the light source is transmitted through the transmission scanning body, and the transmitted light beam is directed to the light diffusing element as the scanning beam, and the scan control unit performs scan control to two-dimensionally change an incident point of the scanning beam to the light diffusing element.

(17) A seventeenth aspect of the present invention is the illumination device according to the first to fifteenth aspects described above, wherein the scanning member includes: a reflection scanning body that has a reflective surface that reflects and emits incident light, and a scanning mechanism that scans by rotating the reflection scanning body about two axes, the light beam from the light source is reflected from the reflection scanning body, and the reflected light beam is directed to the light diffusing element as the scanning beam, and the scan control unit performs scan control to two-dimensionally change an incident point of the scanning beam to the light diffusing element.

(18) An eighteenth aspect of the present invention is the illumination device according to the first to seventeenth aspects described above, wherein the scan control unit performs scanning at a speed at which the illumination area formed on the illumination target surface is visually recognized as a continuous area by human eyes.

(19) A nineteenth aspect of the present invention is the illumination device according to the first to eighteenth aspects described above, the illumination device further provided with a light lighting control unit that controls turning on and off of the light source, wherein the control of turning on and off by the light lighting control unit is performed in conjunction with the scan control by the scan control unit, and the illumination area having the predetermined shape is formed by an assembly of drawing spots when the light source is turned on.

(20) According to a twentieth aspect of the present invention, a color illumination device is configured by providing three sets of the illumination devices according to the first to nineteenth aspects described above, wherein a light source of a first illumination device generates a red light beam, a light source of a second illumination device generates a green light beam, and a light source of a third illumination device generates a blue light beam, a light diffusing element of the first illumination device forms a red illumination area by red diffused light, a light diffusing element of the second illumination device forms a green illumination area by green diffused light, and a light diffusing element of the third illumination device forms a blue illumination area by blue diffused light, and a color illumination area of a predetermined color is formed in an overlapping portion of the red illumination area, the green illumination area, and the blue illumination area.

(21) According to a twenty-first aspect of the present invention, the illumination device according to the first to nineteenth aspects described above or the color illumination device according to the twentieth aspect described above is further provided with a mounting unit for mounting to a vehicle so as to set the illumination target surface on a road surface and to enable illumination with respect to the road surface from the vehicle.

Advantageous Effects of Invention

In the illumination device according to the present invention, the light diffusing element is irradiated with a coherent light beam, and the diffused light therefrom forms the drawing spot on the illumination target surface. Here, the illumination area having a desired shape is drawn by the moving drawing spot if the light beam is scanned. Further, the spread of the diffused light is biased in one direction since the light diffusing element performs the anisotropic diffusion. Thus, it is possible to form the clear illumination area with suppressed blurring on the illumination target surface while securing the safety for the coherent light.

Detailed Description of the Invention

Figure 1:
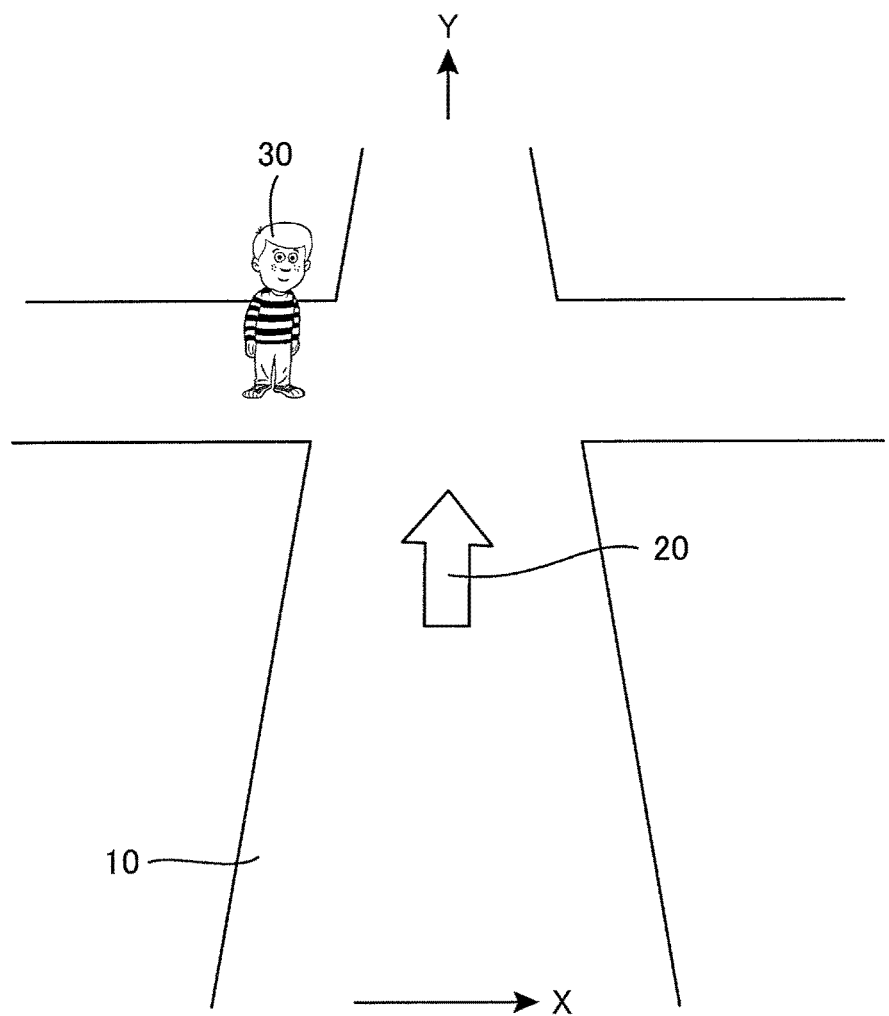
FIG. 1 is a bird's-eye view from a driver's seat illustrating an example in which an illumination area 20 configured using an arrow figure is formed on a road surface 10 by illumination from an in-vehicle illumination device.

Hereinafter, the present invention will be described based on embodiments illustrated in the drawings. Incidentally, in the drawings of the present application, scales, dimensional ratios of longitudinal and lateral dimensions, and the like of the individual constituent elements are slightly changed from those of actual members and are exaggerated as necessary for the sake of convenience of the description. In addition, terms, lengths, angles, and values specifying shapes and geometric conditions used in the present specification (for example, the terms such as "parallel", "orthogo-nal", "same", "coincident", and "rectangular") need to be interpreted including a range of extent where similar functions can be expected without being bound by strict meaning in terms of wording.

§ 1. Characteristic of in-Vehicle Illumination Device

An illumination device according to the present invention is a device suitable for forming an illumination area having a predetermined shape on a predetermined illumination target surface, and particularly suitable for an application to an in-vehicle illumination device that forms an illumination pattern having a desired shape on a road surface. In such an application, an angle formed between an optical axis of illumination light and the illumination target surface is extremely small, and thus, the illumination pattern presented as the illumination area tends to be unclear. In the illumination device according to the present invention, it is possible to form the clear illumination pattern on the illumination target surface even in such an application. Therefore, in § 1, a characteristic of the in-vehicle illumination device configured to form the desired illumination pattern on the road surface will be briefly described as a typical application example of the present invention.

FIG. 1 is a bird's-eye view from a driver's seat illustrating an example in which an illumination area 20 is formed on a road surface 10 serving as an illumination target surface by illumination using the in-vehicle illumination device according to the present invention. This drawing illustrates a state where the road surface 10 in front of a vehicle (car) is viewed from a driver during driving, and a pedestrian 30 stands on the left side in front of the road surface. Here, an X axis and a Y direction are defined in the right direction of the drawing and the depth direction of the drawing (a vehicle traveling direction), respectively, for convenience of the description. A Z axis is defined in a direction (vertical direction) orthogonal to the road surface 10 although not illustrated in FIG. 1.

The drawing illustrates an example in which the illumination area 20 having an arrow shape is formed on the road surface 10. The illumination area 20 is obtained by projecting illumination light from the in-vehicle illumination device onto the road surface 10, and moves forward as the vehicle travels. In practice, an area inside this illumination area 20 is illuminated, and the illumination pattern of the arrow figure is recognized as a bright area on the road surface 10 when viewed from the driver or the pedestrian. The illumination pattern (the illumination area 20) of the arrow shape can be used as an indicator on the road surface to present certain information (for example, the vehicle traveling direction) to the driver or the pedestrian 30. Incidentally, the illumination area 20 is not limited to the arrow figure, and the illumination area 20 having an arbitrary figure pattern or an arbitrary character pattern can be formed by scanning of a light beam which will be described later.

The characteristic of the illumination device according to the present invention is that an arbitrary illumination pattern can be formed on the illumination target surface. In general, it is easy to recognize the illumination area 20 formed on the road surface 10 at night, but it is necessary to secure a sufficient illumination intensity such that the illumination area 20 is displayed with a certain high luminance in the case of daytime. It is possible to secure the sufficient illumination intensity since the illumination device according to the present invention uses a coherent light source that emits coherent light, such as laser light, as will be described later.

Incidentally, there is a risk that the coherent light such as the laser light may damage eyes of an observer because the radiation intensity is much higher than general light. For example, in the case of the example illustrated in FIG. 1, it is necessary to give consideration so as to eliminate danger of the eye damage even when the pedestrian 30 or a driver of an oncoming vehicle directly loots at the illumination light from the illumination device. In the case of the illumination device according to the present invention, the illumination target surface is illuminated with diffused light as will be described later, and thus, the light intensity per unit area of the illumination light is weakened to a sufficiently safe level. Thus, strong coherent light does not enter the human eyes and there is no risk of hurting the human eyes even if the pedestrian 30 or the driver of the oncoming vehicle directly looks at the light source side of the illumination device.

In addition, the illumination pattern formed as the illumination area 20 is likely to be unclear since the angle formed by the optical axis of the illumination light and the illumination target surface (in the illustrated example, the road surface 10) is extremely small in the in-vehicle illumination device. In particular, blurring is likely to occur in a back portion of the illumination pattern formed on the road surface 10 (in the illustrated example, a distal end portion of the arrow) and a contour of a front portion (in the illustrated example, a root portion of the arrow). The illumination device according to the present invention also has a function to cope with such a problem.

Figure 2:
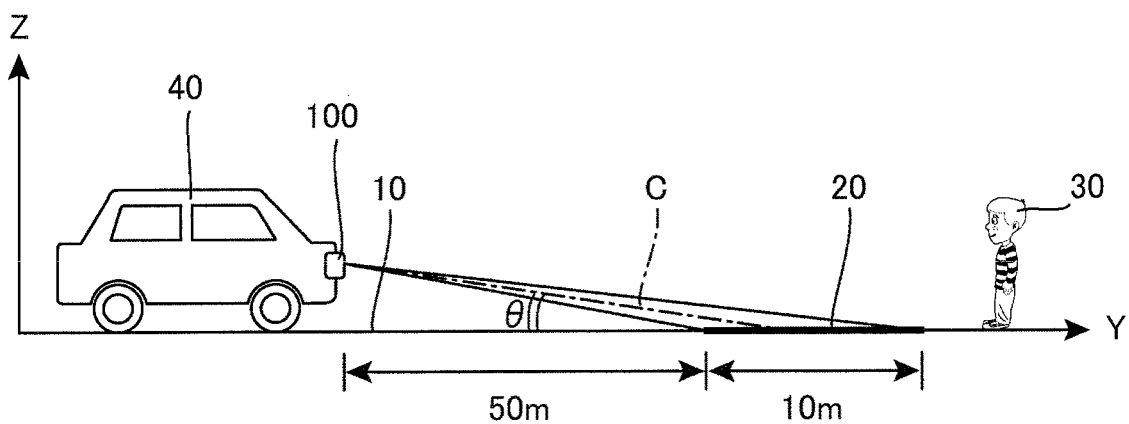
FIG. 2 is a side view illustrating an example in which the illumination area 20 is formed on the road surface 10 by illumination from an in-vehicle illumination device 100.

FIG. 2 is a side view illustrating an example in which the illumination area 20 (thick line portion) is formed on the road surface 10 by illumination from the in-vehicle illumination device 100. In this example, a vehicle (car) 40 travels on the road surface 10 from left to right in the drawing. Here, a Y axis is defined in the traveling direction of the vehicle 40 (right direction in the drawing), and a Z axis is defined in the direction orthogonal to the road surface 10 (upper direction in the drawing) similarly to FIG. 1. An X axis is directed to the front direction perpendicular to the paper surface although not illustrated in FIG. 2.

As illustrated in the drawing, the illumination device 100 according to the present invention is mounted to the front of the vehicle 40, and the front of the road surface 10 is illuminated along an optical axis C. The illumination device 100 according to the embodiment illustrated herein is a device different from a headlight or the like, and serves a role of illuminating the predetermined illumination area 20 on the road surface 10 and presenting a predetermined illumination pattern. In the example illustrated herein, the illumination area 20 is an arrow-shaped figure pattern.

The illumination device 100 illustrated in FIG. 2 is a device different from a headlight or the like of a car, but can be used as the headlight or can be incorporated into the headlight. It is a matter of course that the illumination device 100 can also be used as various illumination lamps, such as a taillight and a searchlight of a car, can also be used by being incorporated in these various illumination lamps or may be used by being mounted to a bumper.

The in-vehicle illumination device 100 illustrated in FIG. 2 has a function of forming the illumination area 20 of an arbitrary shape on the road surface 10 located on an XY plane. The driver usually gazes at the traveling direction of the road surface 10. Therefore, it is necessary to form the illumination area 20 on a quite far side on the road surface 10 in order to bring the illumination area 20 into the center of the driver's field of view. For example, FIG. 2 illustrates an example in which the illumination area 20 (thick line portion) extending by 10 m in the longitudinal direction is formed at a position 50 m ahead of the vehicle 40. When an installation height of the illumination device 100 is set to 75 cm in the case of forming the illumination area 20 at such a position, an angle $\theta$ formed by the optical axis C and the road surface 10 (an irradiation angle with respect to the illumination target surface) is about 0.7°. In FIG. 2, the magnitude of $\theta$ is drawn to be deformed for the sake of convenience, but the angle between the optical axis C and the road surface 10 is extremely small in practice.

In this manner, the in-vehicle illumination device 100 is different from a general projector, and has the characteristic that the light irradiation angle $\theta$ with respect to the illumination target surface is extremely small. In the general projector, a reference of the irradiation angle $\theta$ is 90°, a usage form in which the irradiation angle $\theta$ becomes about 0.7° as in the above example is unexpected. Therefore, when an illumination mechanism used in the general projector is diverted to the in-vehicle illumination device, it becomes difficult to obtain a clear projection image on a projection surface (illumination target surface).

In practice, when the length of the illumination area 20 in the Y-axis direction reaches 10 m as in the example illustrated in FIG. 2, a distance difference between the front and back is 10 m, and thus, it is difficult to clearly display the entire contour line of the rectangular pattern presented as the illumination area 20 in the case of using the general projector. Thus, the illumination pattern projected on the road surface 10 is observed to be blurred when viewed from the driver or the pedestrian 30. Since the irradiation angle $\theta$ is extremely small, the blurring of the contour line is particularly noticeable in a back portion (right end of the illumination area 20 illustrated in FIG. 2) and a front portion (left end of the illumination area 20 illustrated in FIG. 2) when viewed from the driver.

In the illumination device 100 according to the present invention, a coherent light beam is anisotropically diffused to form a drawing spot on the illumination target surface with this diffused light, and the drawing spot is moved by scanning the light beam to form an illumination area having a desired illumination pattern as will be described later. Such anisotropic diffusion is effective in terms of suppressing the blurring of the contour line of the illumination area and is also effective in terms of securing safety for the coherent light as will be described in detail later.

Hereinbefore, the example in which the present invention is applied to the in-vehicle type illumination device has been described as the typical application example of the present invention. The above in-vehicle illumination device 100 is provided with a mounting unit for mounting to the vehicle 40, and can illuminate the illumination target surface set on the road surface 10 from the vehicle 40 by being mounted to the front, rear, side, or the like of the vehicle 40.

However, the illumination device according to the present invention is not necessarily limited to the in-vehicle illumination device. The illumination device according to the present invention can be used by being mounted not only to the vehicle such as a car, a motorcycle, and a bicycle but also to various transportations including a ship, an airplane, and a train. In addition, the illumination device according to the present invention is usable not only to the application mounted to such a transportation but also to an application of being mounted to various structures to present various types of information. For example, if the illumination device according to the present invention is mounted to a structure installed on a road surface or near the road surface, a building, or the like, the illumination device can be used for the application of presenting various information signs and guide signs. It is a matter of course that the illumination target surface on which the illumination area is formed by the illumination device according to the present invention is not necessarily a planar surface, and a curved surface may be used as the illumination target surface according to an application.

§ 2. Overall Configuration of Basic Embodiment

Figure 3:
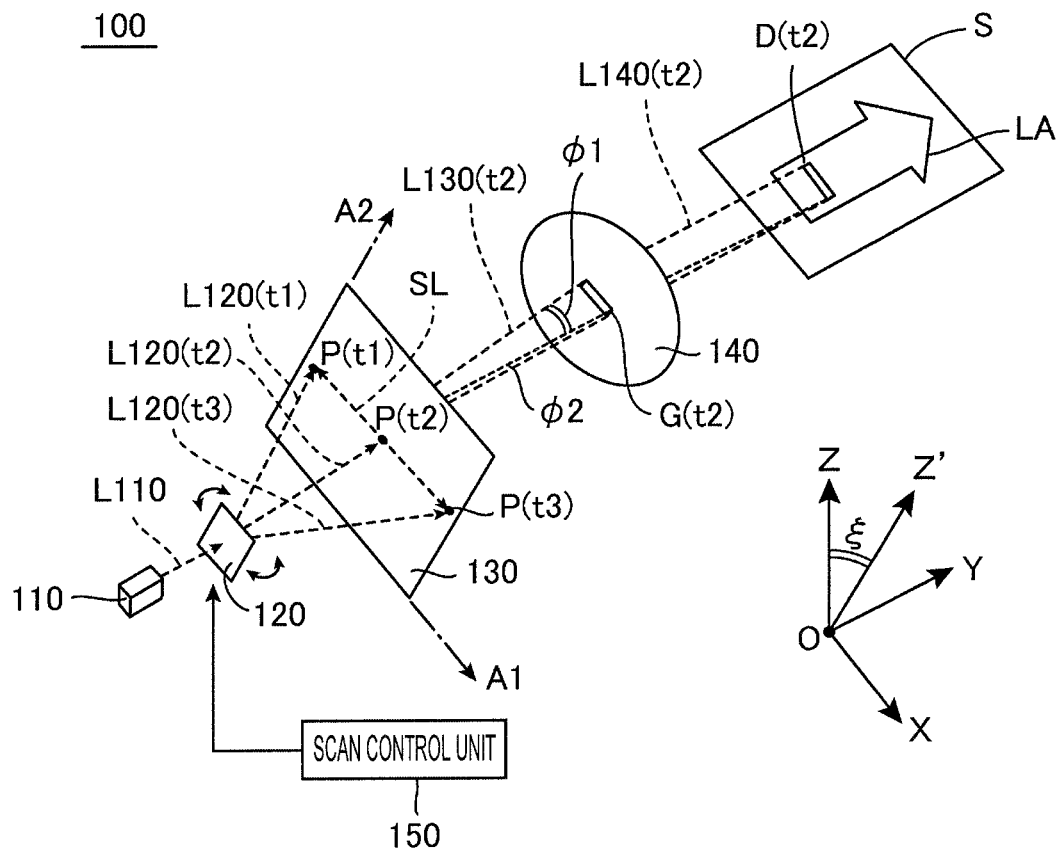
FIG. 3 is a perspective view (a part of which is a block diagram) illustrating a basic configuration of the illumination device 100 according to a basic embodiment of the present invention.

Then, an overall configuration of a basic embodiment of the present invention will be described. FIG. 3 is a perspective view (a part of which is a block diagram) illustrating a basic configuration of the illumination device 100 according to the basic embodiment of the present invention. This illumination device 100 is the in-vehicle device described in § 1, is mounted to a front portion of the vehicle 40 as illustrated in FIG. 2, and has a function of forming the illumination area 20 by illuminating the road surface 10 that is the illumination target surface.

As illustrated in FIG. 3, the illumination device 100 includes a light source 110, a scanning member 120, a light diffusing element 130, an illumination optical system 140, and a scan control unit 150 (illustrated in a block diagram), and forms an illumination area LA having a predetermined shape on a predetermined illumination target surface S. In this example, the illumination target surface S is a road surface in front of the vehicle, and FIG. 3 illustrates a state where the illumination area LA having an illumination pattern of an arrow figure is formed. Incidentally, a contour of the illumination target surface S is illustrated as a rectangle in FIG. 3 for convenience of the description, but the illumination target surface S is a conceptual surface and is not necessarily the rectangular surface. In addition, the illumination target surface S may be a curved surface as described above.

Here, an XYZ three-dimensional orthogonal coordinate system having the X axis, the Y axis, and the Z axis in the respective directions illustrated in the drawing is defined for convenience of the description, and the arrangement of each constituent element will be described with reference to this coordinate system. Each direction of the X axis, Y axis, and Z axis in the coordinate system illustrated in FIG. 3 is the same as each direction of the coordinate axes illustrated in FIGS. 1 and 2, the Y axis is the traveling direction of the vehicle 40, the X axis is the lateral direction orthogonal to the Y axis, and the Z axis is the vertical direction. The X axis and the Y axis are axes on a horizontal plane, and the illumination target surface S (road surface 10) corresponds to an XY plane.

Incidentally, a Z' axis is an axis that can be obtained by rotating the Z axis by a predetermined tilt angle ξ with the X axis as a rotation axis (rotating the Z axis clockwise when viewed in a negative direction of the X axis). Therefore, an XZ' plane is a plane tilted by rotating the XZ plane by the tilt angle ξ with the X axis as a rotation axis. The light diffusing element 130 and the illumination optical system 140 are arranged on a plane parallel to the XZ' plane as will be described later.

The light source 110 is a constituent element that emits a coherent light beam L110, and in general, a laser light source that emits laser light may be used. There are various types of laser light sources, and any type of laser light source may be used. A semiconductor laser, which emits the light beam L110 having a circular cross section whose diameter is about several tens of μm, is used in the embodiment illustrated herein.

The scanning member 120 is a constituent element that scans the light beam L110 from the light source 110. FIG. 3 illustrates an example in which the scanning member 120 scans the light beam L110 one-dimensionally. Specifically, optical paths of the light beam L120 after having been subjected to scan (hereinafter referred to as scanning beams L120) are illustrated as a scanning beam L120(t1), a scanning beam L120(t2), and a scanning beam L120(t3), respectively, for three scanning time points t1, t2, and t3.

That is, the light beam L110 is emitted to an incident point P(t1) of the light diffusing element 130 as the scanning beam L120(t1) at the scanning time point t1, the light beam L110 is emitted to an incident point P(t2) of the light diffusing element 130 as the scanning beam L120(t2) at the scanning time point t2, and the light beam L110 is emitted to an incident point P(t3) of the light diffusing element 130 as the scanning beam L120(t3) at the scanning time point t3.

In the illustrated embodiment, the scanning member 120 includes: a transmission scanning body (a constituent element indicated by reference sign 120 in the drawing) that emits light incident on a first surface from a second surface; and a scanning mechanism (an element constituted by a motor, a gear, and the like) (not illustrated) that rotates and scans the transmission scanning body. As the transmission scanning body, refractive members, such as a transparent plate-shaped member and a prism, can be used. A traveling direction of the emitted light can be changed by rotating these members. When the above-described one-dimensional scanning is performed, the transmission scanning body may be rotated about a rotation axis by the scanning mechanism with an axis parallel to the Z' axis as the rotation axis. A double arrow illustrated in the drawing indicates such a rotation state.

The light diffusing element 130 is a flat plate-shaped constituent element arranged on the plane parallel to the XZ' plane, and an incident point P of the scanning beam L120 on the light diffusing element 130 moves along a scan line SL parallel to the X axis as indicated by a dashed line in the drawing when the scanning member 120 performs the above-described one-dimensional scanning (rotational scanning about the axis parallel to the Z' axis). Therefore, the scanning member 120 scans the light beam one-dimensionally in the X-axis direction in this case. The light diffusing element 130 having received the scanning beam L120 scanned by the scanning member 120 diffuses the received scanning beam L120, and emits diffused light L130. FIG. 3 illustrates a state where diffused light L130(t2) is emitted by diffusing the scanning beam L120(t2) emitted to the incident point P(t2) at the scanning time point t2.

Although not illustrated in FIG. 3, it is a matter of course that diffused light L130(t1) of the scanning beam L120(t1) is emitted from the incident point P(t1) at the scanning time point t1, and diffused light L130(t3) of the scanning beam L120(t3) is emitted from the incident point P(t3) at the scanning time point t3.

Here, an important point is that the light diffusing element 130 anisotropically diffuses the coherent light (scanning beam L120) scanned by the scanning member 120. Here, the anisotropic diffusion means not to diffuse coherent light isotropically in a two-dimensional direction from a light emitting surface of the light diffusing element 130 but to diffuse coherent light such that a diffusion range of the coherent light with respect to a predetermined direction is larger than a diffusion range with respect to a direction intersecting the predetermined direction. More preferably, the diffusion range of the coherent light with respect to the predetermined direction is much larger than the diffusion range with respect to the direction intersecting the predetermined direction. That is, the light diffusing element 130 may diffuse the coherent light (scanning beam L120) scanned by the scanning member 120 mainly in a uniaxial direction.

In other words, when a first diffusion axis A1 and a second diffusion axis A2 are defined on the light emitting surface of the light diffusing element 130 as illustrated in the drawing, the light diffusing element 130 performs anisotropic diffusion such that a first diffusion angle φ1 indicating the extent of spread of the diffused light L130 in a direction of the first diffusion axis A1 is different from a second diffusion angle φ2 indicating the extent of spread of the diffused light in a direction of the second diffusion axis A2. In the illustrated example, the light diffusing element 130 is arranged on the plane parallel to the XZ' plane, the first diffusion axis A1 is set as an axis parallel to the X axis, and the second diffusion axis A2 is set as the axis parallel to the Z' axis. Further, the first diffusion angle φ1 is set to be larger than the second diffusion angle φ2 (for example, φ1 is set to be equal to or larger than twice, preferably five times, and more preferably ten times of φ2).

In this manner, the diffused light L130 emitted from the light diffusing element 130 is incident to the illumination optical system 140. The illumination optical system 140 is an optical system that guides the diffused light L130 to the illumination target surface S (in this example, the XY plane), and a collimator lens (one convex lens) is used as the illumination optical system 140 in the embodiment illustrated herein. It is a matter of course that an optical system in which a plurality of lenses are combined may be used as the illumination optical system 140.

The illustrated example illustrates a state where the diffused light L130(*t*2) at the scanning time point t2 forms a diffused light spot G(t2) on a front surface of the illumination optical system 140. The diffused light spot G(t2) is a spot formed on a virtual projection plane defined at a front surface position of the illumination optical system 140 (a position before being subjected to optical action of the illumination optical system 140). In the illustrated embodiment, the first diffusion axis A1 and the second diffusion axis A2 are axes orthogonal to each other, and a cross section obtained by cutting the diffused light L130 along a plane orthogonal to a central axis thereof is rectangular. Thus, a shape of the diffused light spot G(t2) is also rectangular.

In this manner, the diffused light L130(*t*2) that has passed through the illumination optical system 140 is guided to the illumination target surface S as illumination light L140(*t*2) to form a drawing spot D(t2) on the illumination target surface S (XY plane). The drawing spot D(t2) is obtained by projecting the diffused light spot G(t2) on the illumination target surface S through the illumination optical system 140, and thus, basically becomes a figure close to a rectangle although slightly deformed. Further, the drawing spot D(t2) becomes a figure close to a rectangle having two sides along the X axis as long sides and two sides along the Y axis as short sides in this embodiment. Such a shape of the drawing spot D(t2) is important in terms of reducing blurring in the illumination area LA (in the illustrated example, an illumination pattern of an arrow figure) as will be described in detail in § 5.

Although FIG. 3 illustrates the example in which the drawing spot D(t2) is formed based on the diffused light spot G(t2) at the scanning time point t2, it is a matter of course that a drawing spot D(t1) is formed based on the diffused light spot G(t1) at the scanning time point t1, and a drawing spot D(t3) is formed based on the diffused light spot G(t3) at the scanning time point t3. When the one-dimensional scanning as illustrated in the drawing is performed, the incident point P of the scanning beam L120 to the light diffusing element 130 moves along the scan line SL parallel to the X axis, and thus, the drawing spot D formed on the illumination target surface S also moves substantially along the X axis in response to the scanning.

In this manner, when the scanning using the scanning member 120 is performed, the diffused light L130 obtained by the anisotropic diffusion forms the drawing spot D on the illumination target surface S through the illumination optical system 140 at each scanning time point. Further, formation positions of the drawing spot D differ depending on the individual scanning time points, and thus, the illumination area LA having a predetermined shape is formed as a union of the individual drawing spots D obtained at the individual scanning time points.

FIG. 3 illustrates a state where the illumination area LA including the illumination pattern of the arrow figure is formed as such a union of the individual drawing spots D. In practice, two-dimensional scanning is required to form such an arrow-shaped illumination pattern. It is a matter of course that it is possible to form a linear illumination pattern along the X axis even by one-dimensional scanning, and a scanning direction by the scanning member 120 may be a one-dimensional direction or a two-dimensional direction. Meanwhile, it is preferable that the scanning member 120 have the two-dimensional scanning function in practical use in terms of forming the illumination area LA formed of a figure, a character, or the like having an arbitrary shape.

It is a matter of course that the resolution of the obtained illumination area LA is limited by a size of the drawing spot D even when the two-dimensional scanning is performed, and thus, it is difficult to accurately draw a sharp portion of an arrow head of the arrow figure illustrated as the illumination area LA in FIG. 3 using the drawing spot D of the size illustrated in FIG. 3. However, it is possible to draw a pattern having an arbitrary shape with higher resolution by the two-dimensional scanning if the size of the drawing spot D is decreased. In the following description, an example in which an incident surface of the light diffusing element 130 extends on a two-dimensional plane and the scanning member 130 repeatedly scans coherent light along the two-dimensional direction of the incident surface will be described.

Figure 4:
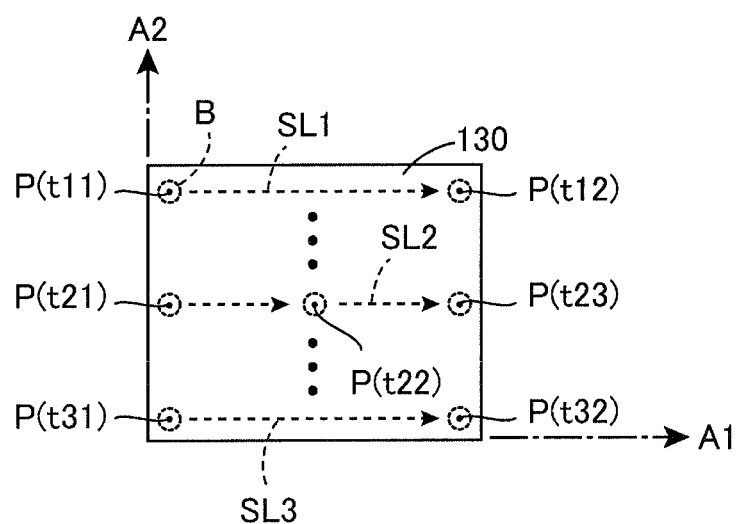
FIG. 4 is a plan view illustrating an example of two-dimensional scanning of a light beam on a light diffusing element 130 illustrated in FIG. 3.

FIG. 4 is a plan view illustrating an example of the two-dimensional scanning on the light diffusing element 130 illustrated in FIG. 3. A method of the two-dimensional scanning illustrated herein is a method generally called raster scan, and is used to scan an electron beam in a CRT display. Specifically, first, the scanning beam L120 is made incident on an incident point P(t11) in the upper left corner to form a beam spot B at this position at a scanning time point t11. The example illustrated herein is an example of a case where the light beam L110 having the circular cross section is emitted from the light source 110, and the substantially circular beam spot B is formed at the position of the incident point P(t11) on the light diffusing element 130 as indicated by a dashed line.

Here, when the one-dimensional scanning in the direction of the first diffusion axis A1 is performed by the scanning member 120, the beam spot B moves from left to right along a scan line SL1 and reaches a position of an incident point P(t12) at a scanning time point t12. Subsequently, operations of returning the beam spot B to a position one row below the leftmost incident point P(t11), returning the beam spot B again to a position one row below at the left end after scanning from left to right, and so on are repeated in order the operations in order. Finally, the beam spot B is moved from left to right along a scan line SL3 from a position of the leftmost incident point P(t31) at the lowermost row, and scanning for one frame is completed when the beam spot B reaches a position of the rightmost incident point P(t32).

When the scanning for one frame is completed, the beam spot B is returned from the incident point P(t32) at the lower right corner to the position of the incident point P(t11) at the upper left corner, and scanning for one frame is performed again (or the beam spot B may be returned by tracing back a scanning path corresponding to a previous frame from the incident point P(t32) to the incident point P(t11)). The scan line SL from the incident point P(t1)→P(t2)→P(t3) illustrated in FIG. 3 corresponds to a scan line SL2 from an incident point P(t21)→P(t22)→P(t23) illustrated in FIG. 4.

As in the example illustrated in FIG. 4, when the raster scan is performed such that the incident point P of the scanning beam L120 extends over the entire area of the light diffusing element 130, the drawing spot D formed on the illumination target surface S is also two-dimensionally scanned in the same manner. Therefore, a substantially rectangular illumination area (a rectangular area such as the rectangular illumination target surface S illustrated in FIG. 3) is formed on the illumination target surface S in this case. It is sufficient to scan the inside of a partial area corresponding to the arrow figure instead of the raster scan over the entire area of the light diffusing element 130 in order to form the illumination area LA having the arrow shape as illustrated in FIG. 3 (if a modification to be described in § 6.1 is adopted, the illumination area LA having an arbitrary pattern such as an arrow figure can be formed while performing the raster scan over the entire area by performing light lighting control with respect to the light source 110).

It is convenient to perform vector scan instead of the above-described raster scan in order to form the illumination area LA having an arbitrary figure pattern or character pattern. The vector scan is scan that moves the beam spot B along an arbitrary vector defined on the light diffusing element 130. If the scanning member 120 has the function of performing the two-dimensional scanning, it is possible to move the beam spot B to an arbitrary position on the light diffusing element 130 by combining a scanning amount in the direction of the first diffusion axis A1 and a scanning amount in the direction of the second diffusion axis A2. That is, it is possible to perform scanning such that the beam spot B draws an arbitrary locus on the light diffusing element 130.

The scan control unit 150 illustrated as a block in FIG. 3 is actually configured using an electronic circuit or a computer, and serves a role of controlling the scanning of the scanning member 120 such that the incident point P of the scanning beam L120 to the light diffusing element 130 draws a predetermined locus. In order to form the illumination area LA having an arbitrary shape on the illumination target surface S, it is sufficient for the scan control unit 150 to perform scan control to two-dimensionally change the incident point P of the scanning beam L120 on the light diffusing element 130 such that the pattern of the arbitrarily shape can be drawn. Then, the drawing can be performed by moving the drawing spot D on the illumination target surface S so that the illumination area LA having a predetermined shape can be formed.

It is a matter of course that the rectangular drawing spot D is recognized as moving from the human eyes if a movement speed of the drawing spot D is slow, and thus, the scan control unit 150 performs scanning at a speed at which the illumination area LA formed on the illumination target surface S is visually recognized as a continuous area by the human eyes in practice.

§ 3. Configuration of Light Diffusing Element

Here, a configuration of the light diffusing element 130 in the illumination device 100 illustrated in FIG. 3 will be described in more detail.

<3.1 Light Diffusing Element that Generates Diffused Light by Diffraction Phenomenon>

As already described in § 2, the light diffusing element 130 according to the present invention is the constituent element that receives the scanning beam L120 scanned by the scanning member 120, diffuses the received scanning beam L120, and emits the diffused light L130, and has the characteristic of performing the anisotropic diffusion such that the extent of spread of diffused light in the direction of the first diffusion axis A1 (in the above-described embodiment, the first diffusion angle φ1) is different from the extent of spread of diffused light in the direction of the second diffusion axis A2 (in the above-described embodiment, the second diffusion angle φ2).

As the light diffusing element 130 that performs the anisotropic diffusion having such a characteristic, for example, a diffractive optical element (DOE), a holographic optical element (HOE), or the like can be used. In addition, the light diffusing element 130 may be configured using a microlens array, a lenticular lens, a diffusion plate, or the like. It is a matter of course that a diffractive optical element having a function equivalent to that of the microlens array or the lenticular lens may be used by incorporating the function of the microlens array or the lenticular lens into the diffractive optical element.

Here, an example in which the light diffusing element 130 is configured using the diffractive optical element or the holographic optical element will be described in detail. These elements generate diffused light by a light diffraction phenomenon, and it is possible to realize a desired anisotropic diffusion characteristic by adjusting a diffraction angle by devising a configuration of a diffraction pattern to be recorded. Hereinafter, an actual state of anisotropic diffusion caused by the light diffraction phenomenon will be described in more detail.

Figure 5:
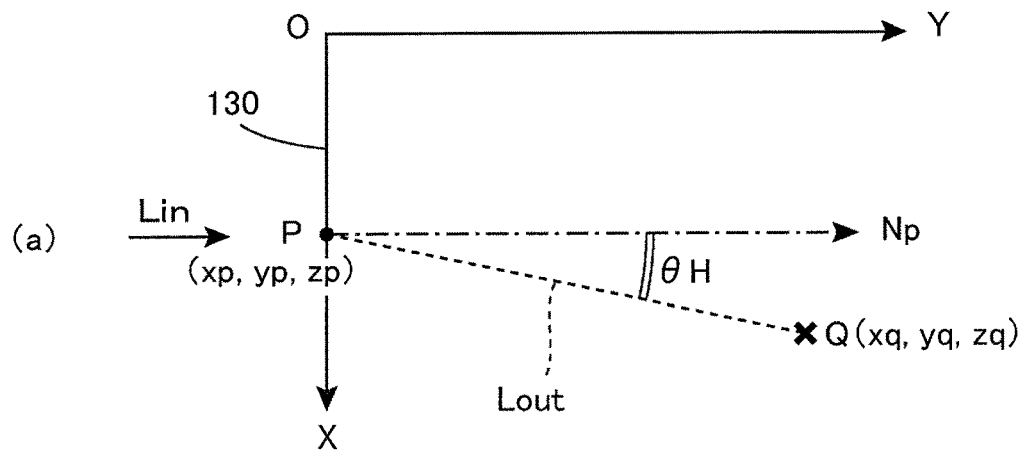
FIG. 5 is a view illustrating a method of expressing an angular spatial distribution of intensity of first-order diffracted light emitted from one point P on the light diffusing element 130 using displacement angles θV and θH.
Figure 5:
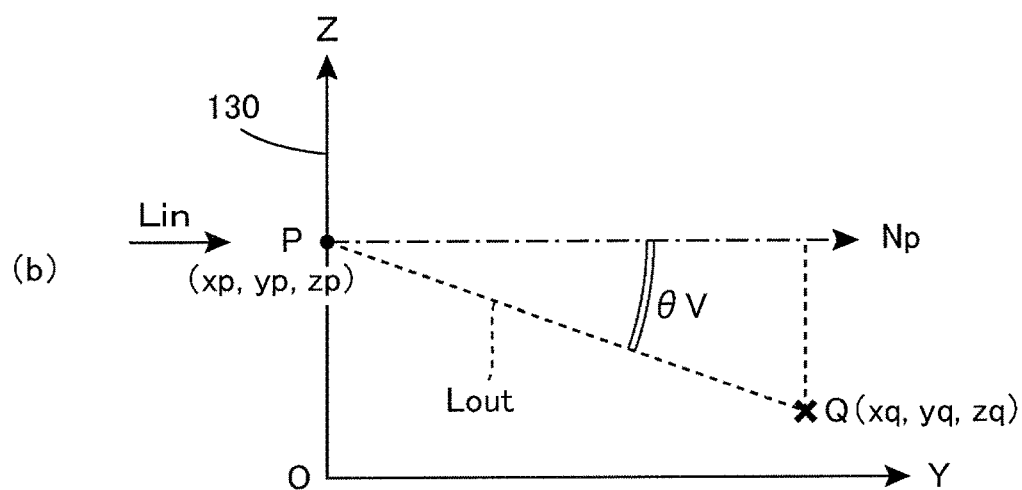
Figure 5:
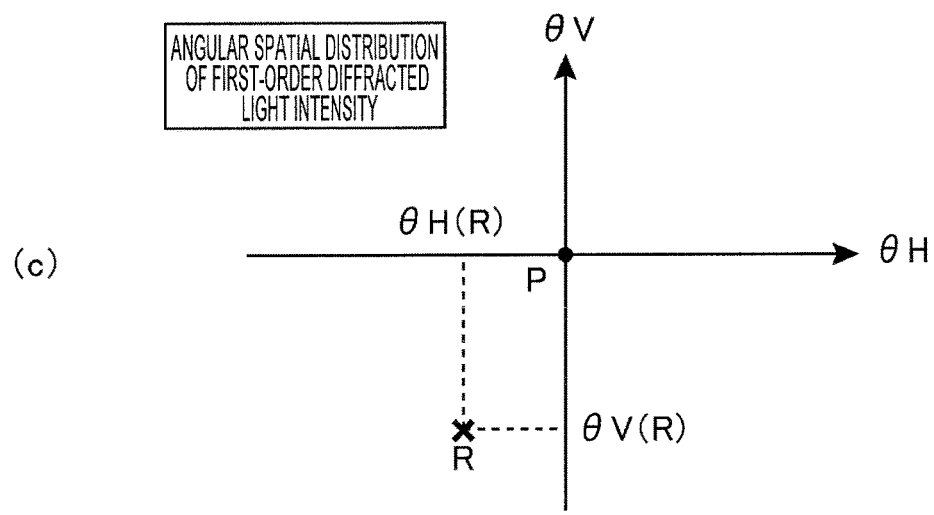

FIG. 5 is a view illustrating a method of expressing an angular spatial distribution of intensity of first-order diffracted light emitted from one point P on the light diffusing element 130 using displacement angles θV and θH. Incidentally, zeroth-order diffracted light and second-order diffracted light are also emitted from the light diffusing element 130, the intensity of the first-order diffracted light becomes dominant for practical use, only the first-order diffracted light is considered herein. Hereinafter, it is assumed that a diffractive surface (light emitting surface) of the light diffusing element 130 is arranged on the XZ plane, and a direction of first-order diffracted light Lout emitted from one point P (xp, yp, zp) on the diffractive surface located at coordinates (xp, yp, zp) when the incident light Lin is applied at a predetermined incident angle is considered.

FIG. 5(a) is a projection view (projection view on an XY plane) of an XYZ three-dimensional orthogonal coordinate system viewed from above, and the right side of the drawing, the lower side of the drawing, and a front direction perpendicular to the paper surface of the drawing are set to a Y-axis positive direction, an X-axis positive direction, and a Z-axis positive direction, respectively. Further, the light diffusing element 130 is arranged on an XZ plane of this coordinate system. Here, an optical path (dashed line) of emitted light Lout emitted from the point P as the first-order diffracted light in the case of applying the incident light Lin to the point P on the light diffusing element 130 from a predetermined direction will be considered. FIG. 5(a) illustrates a state where the first-order diffracted light Lout (dashed line) emitted from the point P is directed to an arbitrary point Q (xq, yq, zq) in a three-dimensional space.

In the illustrated example, the first-order diffracted light Lout is emitted in a direction forming a first direction displacement angle θH with respect to a normal line Np (parallel to the Y axis) to the point P. This first direction displacement angle θH corresponds to a displacement angle in a horizontal direction (direction along a horizontal plane parallel to the XY plane) for the incident light Lin. Here, a counterclockwise direction is set as a positive direction of the first direction displacement angle θH (the illustrated displacement angle θH takes a negative value) in the projection view illustrated in FIG. 5(a).

On the other hand, FIG. 5(b) is a projection view (projection view on a YZ plane) of the XYZ three-dimensional orthogonal coordinate system viewed from the side, and the right side of the drawing, the upper side of the drawing, and a front direction perpendicular to the paper surface of the drawing are set to a Y-axis positive direction, a Z-axis positive direction, and an X-axis positive direction, respectively. As described above, the light diffusing element 130 is arranged on an XZ plane of this coordinate system. Here, an optical path (dashed line) of emitted light Lout emitted from the point P as the first-order diffracted light in the case of applying the incident light Lin to the point P on the light diffusing element 130 from a predetermined direction will be also considered. FIG. 5(b) also illustrates a state where the first-order diffracted light Lout (dashed line) emitted from the point P is directed to the point Q in a three-dimensional space (the same point as the point Q illustrated in FIG. 5(a)).

In the illustrated example, the first-order diffracted light Lout is emitted in a direction forming a second direction displacement angle θV with respect to a normal line Np (parallel to the Y axis) to the point P. This second direction displacement angle θV corresponds to a displacement angle in a vertical direction (direction parallel to the Z axis) for the incident light Lin. Here, a counterclockwise direction is set as a positive direction of the second direction displacement angle θV (the illustrated displacement angle θV takes a negative value) in the projection view illustrated in FIG. 5(b).

In this manner, a traveling direction (diffraction direction) of one beam of the diffracted light Lout emitted from the arbitrary one point P of the light diffusing element 130 can be expressed by two sets of angles, that is, the first direction displacement angle θH and the second direction displacement angle θV. That is, a direction of the diffracted light from the point P (xp, yp, zp) to the point Q (xq, yq, zq) can be expressed by the two sets of angles (θH, θV).

Therefore, the direction of the first-order diffracted light emitted from the certain point P can be indicated by position coordinates of distribution points R on an angular spatial distribution map expressed by a two-dimensional orthogonal coordinate system θH-θV as illustrated in FIG. 5(c). The distribution point R illustrated in FIG. 5(c) is a point plotted at coordinates indicated by an abscissa value θH(R) and an ordinate value θV(R) in this distribution map, and indicates the direction of the emitted light Lout illustrated in FIGS. 5(a) and 5(b). When the diffraction plane (XZ plane) of the light diffusing element 130 illustrated in FIGS. 5(a) and 5(b) is observed from the right direction of the drawing (when observed in a direction opposite to an arrow of the normal line Np), a projection image of the point Q on the XZ plane is located at the lower left of the point P. The distribution point R illustrated in FIG. 5(c) corresponds to the point Q illustrated in FIGS. 5(a) and 5(b), and is also located at the lower left of the point P.

Although the example in which the incident light Lin is incident on the geometrical point P on the light diffusing element 130 and is emitted as one beam of emitted light Lout after the direction of the incident light Lin is changed has been described for convenience of the description hereinbefore, the scanning beam L120 incident on the light diffusing element 130 actually forms the beam spot B having the area to a certain extent as illustrated in FIG. 4. Thus, an optical phenomenon that occurs on the light diffusing element 130 at a certain scanning time point is a phenomenon in which a near-field area of one point P is irradiated with the beam spot B, and the diffused light L130 spreads from the entire near-field area due to a diffraction pattern formed in the near-field area. Therefore, in practice, the one beam of emission light Lout is not emitted from the point P, and the diffused light L130 having a spread width to a certain extent is emitted from the vicinity of the point P as illustrated in FIGS. 5(a) and 5(b).

Regarding the respective distribution points R on the two-dimensional orthogonal coordinate system θH-θV illustrated in FIG. 5(c), one defining a predetermined intensity value is information indicating the angular spatial distribution of intensity of the first-order diffracted light diffracted by the diffraction pattern near the point P, and this is information indicating a diffraction characteristic of the diffraction pattern near the point P. For example, the light diffusing element 130 having the angular spatial distribution of the first-order diffracted light intensity in which an intensity value of 100 is defined only at a position of the distribution point R (θH(R), θV(R)) illustrated in FIG. 5(c) and an intensity value of 0 is defined for all the other portions is an element that has diffraction characteristic in which only one beam of emitted light Lin having the intensity value of 100 is emitted as the first-order diffracted light for the incident light Lin as illustrated in FIGS. 5(a) and 5(b).

It is a matter of course that the angular spatial distribution of the first-order diffracted light intensity changes depending on the incident angle of the incident light Lin. Although the incident angle is 0° in the example illustrated in FIGS. 5(a) and 5(b), a direction of the emitted light Lout also changes if this incident angle is changed, the first direction displacement angle θH and the second direction displacement angle θV also change, and the angular spatial distribution illustrated in FIG. 5(c) also changes. Therefore, the angular spatial distribution illustrated in FIG. 5(c) represents the angular spatial distribution of the intensity of the first-order diffracted light obtained when the vicinity of the point P is irradiated with the incident light Lin at a specific incident angle.

<3.2 Vertical Arrangement of Light Diffusing Element>

Figure 6:
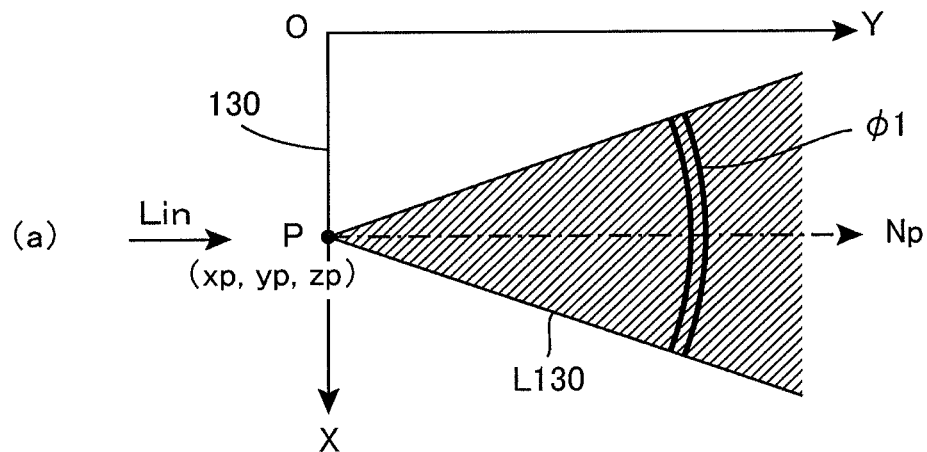
FIG. 6 is a view illustrating a state of diffused light L130 emitted from the vicinity of the point P when incident light Lin is applied near the point P on the light diffusing element 130 arranged on an XZ plane.
Figure 6:
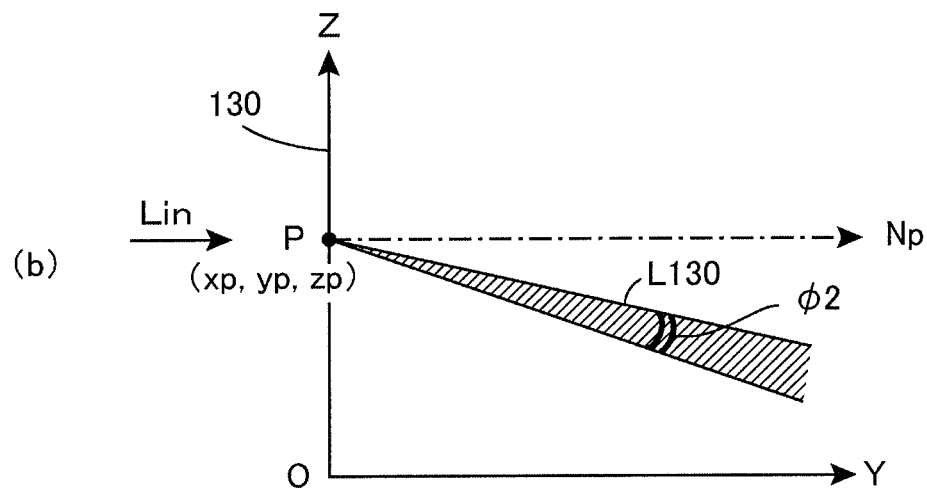
Figure 6:
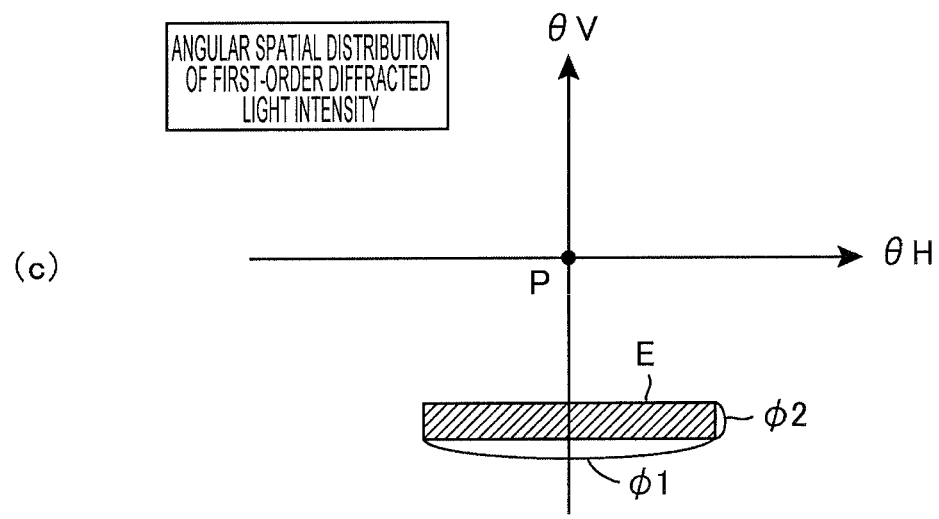

FIG. 6 is a view illustrating a state of the diffused light L130 emitted from the vicinity of the point P when incident light Lin is applied near the point P on the light diffusing element 130 arranged on the XZ plane. Similarly to FIG. 5(a), FIG. 6(a) is a projection view (projection view on the XY plane) of the XYZ three-dimensional orthogonal coordinate system viewed from above, and the right side of the drawing, the lower side of the drawing, and the front direction perpendicular to the paper surface of the drawing are set to the Y-axis positive direction, the X-axis positive direction, and the Z-axis positive direction, respectively. On the other hand, similarly to FIG. 5(b), FIG. 6(b) is a projection view (projection view on the YZ plane) of the XYZ three-dimensional orthogonal coordinate system viewed from the side, and the right side of the drawing, the upper side of the drawing, and the front direction perpendicular to the paper surface of the drawing are set to the Y-axis positive direction, the Z-axis positive direction, and the X-axis positive direction, respectively. As described above, the light diffusing element 130 is arranged on an XZ plane of this coordinate system.

In the example illustrated in FIG. 6, when the incident light Lin having the predetermined incident angle (incident angle=0° in this example) is applied near the point P of the diffractive surface (XZ plane) of the light diffusing element 130, the diffused light L130, which spreads at the first diffusion angle φ1 with the normal line Np as a center as illustrated in FIG. 6(a) regarding the X-axis direction (horizontal direction) and spreads at the second diffusion angle φ2 so as to be directed to the lower side of the normal line Np as illustrated in FIG. 6(b) regarding the Z-axis direction (vertical direction, is obtained. The hatched area in the drawing is a diffraction range of the diffused light L130. Incidentally, the state where the diffused light L130 spreads from one point P is drawn in FIGS. 6(a) and 6(b) for the sake of convenience, but the diffused light L130 is actually emitted from the entire near-field area of the point P corresponding to the beam spot B formed by the light beam emitted as the incident light Lin.

As a result, a diffraction pattern having a diffraction characteristic that causes the diffused light L130 illustrated in FIGS. 6A and 6B as the diffracted light is formed in the area near the point P of the light diffusing element 130. This diffraction characteristic can be represented as an angular spatial distribution of the first-order diffracted light intensity illustrated in FIG. 6(c). FIG. 6(c) illustrates a rectangular diffracted light distribution area E (hatched portion). This diffracted light distribution area E indicates a specific range of the first direction displacement angle θH and the second direction displacement angle θV, a horizontal width thereof corresponds to the first diffusion angle φ1, and a vertical width thereof corresponds to the second diffusion angle φ2.

Incidentally, the angular spatial distribution of the first-order diffracted light intensity is set such that predetermined intensity values are defined, respectively, at coordinate positions of the two-dimensional coordinate system illustrated in FIG. 6(c). That is, the diffracted light distribution area E is drawn as the hatched rectangular area in FIG. 6(c), but the angular spatial distribution of the first-order diffracted light intensity is set such that the predetermined intensity value is defined at each portion. For example, in the case of the light diffusing element 130 having the angular spatial distribution of the first-order diffracted light intensity in which an intensity value of 100 is defined inside the diffracted light distribution area E in FIG. 6(c) and an intensity value of 0 is defined in the other portions, the first-order diffracted light having the intensity value of 100 travels only in the area illustrated by hatching in FIGS. 6(a) and 6(b), and the first-order diffracted light does not travel in the other areas.

The diffracted light distribution area E illustrated in FIG. 6(c) is bilaterally symmetrical with the vertical axis θV as a central axis because the diffused light L130 spreads so as to have a symmetric shape with the normal line Np as the center as illustrated in FIG. 6(a). In addition, the diffracted light distribution area E illustrated in FIG. 6(c) is arranged at a position below the origin P (position where the coordinate value θV takes a negative value) because the diffused light L130 travels to the lower side of the normal line Np as illustrated in FIG. 6(b). In this manner, if the diffused light L130 travels downward, it is convenient for illumination of the XY plane which serves as the illumination target surface.

The example illustrated in FIG. 6 is an example in which the light emitting surface (diffractive surface) of the light diffusing element 130 is arranged on the XZ plane. If the light emitting surface of the light diffusing element 130 is arranged on the XZ plane or the plane (which will be simply referred to as the plane parallel to the XZ plane including the XZ plane itself in the present application) parallel to the XZ plane in this manner, the light emitting surface of the light diffusing element 130 is orthogonal to the illumination target surface (XY plane). Therefore, such an arrangement of the light diffusing element 130 will be referred to as a "vertical arrangement" in the present application.

In the in-vehicle illumination device 100 illustrated in FIG. 2, when the light diffusing element 130 is arranged vertically and illumination is performed on the road surface 10 as the illumination target surface, it is necessary to cause the optical axis C of illumination light to be directed obliquely downward. Therefore, in the case of the embodiment that adopts the vertical arrangement, it is convenient to grant the diffraction characteristic that the diffused light L130 travels downward to the light diffusing element 130 as illustrated in FIG. 6(b). The diffracted light distribution area E illustrated in FIG. 6(c) represents the diffraction characteristic of the light diffusing element 130 designed based on such consideration.

Since the diffused light L130 travels downwards as illustrated in FIG. 6(b), it is preferable to arrange the illumination optical system 140 in this traveling direction. In addition, it is preferable to arrange the illumination optical system 140 in a direction in which the main surface thereof is orthogonal to the central axis of the diffused light L130. Incidentally, the incident light Lin is incident in the direction of the normal line Np in the example illustrated in FIG. 6(b), and thus, it becomes possible to arrange the light source 110, the scanning member 120, and the light diffusing element 130 on a straight line if the optical axis of the light source 110 is made coincident to the normal line Np, and it is possible to realize the illumination device having a simple structure as a whole.

It is a matter of course that the light source 110 and the scanning member 120 can be arranged at arbitrary positions in accordance with design conditions. For example, FIGS. 6(a) and 6(b) illustrate the example in which the incident light Lin (scanning beam L120) is incident perpendicularly to the incident surface, but the incident direction of the incident light Lin is not necessarily perpendicular to the incident surface, and thus, the light source 110 and the scanning member 120 are not necessarily arranged on the straight line passing through the normal line Np.

Even when the direction of the incident light Lin (scanning beam L120) with respect to the light diffusing element 130 is set to an arbitrary direction, it is possible to obtain the diffused light directed in exactly the same direction as the diffused light L130 illustrated in FIGS. 6(a) and 6(b) if the diffraction pattern to be recorded in the light diffusing element 130 is adjusted. Therefore, the arrangement of the light source 110 and the scanning member 120 is not particularly limited in terms of implementing the present invention. However, it is necessary to cause the diffused light L130 emitted from the light diffusing element 130 to be directed in a preset direction of the illumination target surface, and thus, it is preferable to determine the incident direction of the incident light Lin (scanning beam L120) in advance and record the diffraction pattern, which has the diffraction characteristic that the incident light Lin incident from this direction is directed to the illumination target surface, in the light diffusing element 130 in terms of designing the light diffusing element 130.

<3.3 Oblique Arrangement of Light Diffusing Element>

Figure 7:
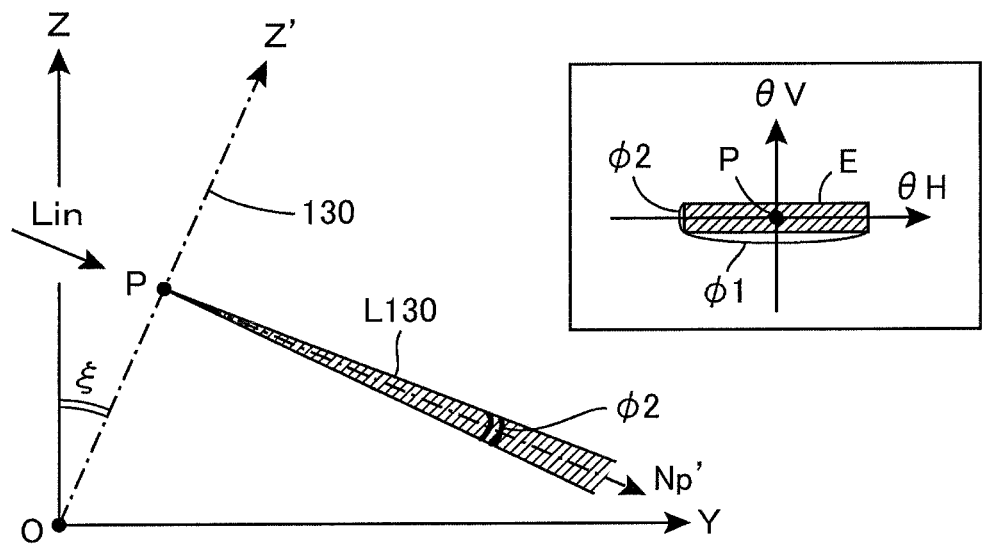
FIG. 7 is a view illustrating a state of the diffused light L130 emitted from the vicinity of the point P when the incident light Lin is applied near the point P on the light diffusing element 130 arranged on an XZ' plane.

Meanwhile, FIG. 7 is a side projection view illustrating an example in which the light emitting surface (diffractive surface) of the diffusing element 130 is arranged to be tilted with respect to the XZ plane. The Z' axis indicated by a one-dot chain line in the drawing is an axis obtained by rotating the Z axis by the predetermined tilt angle ξ with the X axis as a rotation axis. Even in this example, the illumination target surface is set on the XY plane, and the diffusion element 130 has the light emitting surface (diffractive surface) located on the XZ' plane or a plane (which will be simply referred to as the plane parallel to the XZ' plane including the XZ' plane itself in the present application) parallel to the XZ' plane In the present application, such an arrangement of the light diffusing elements 130 will be referred to as an "oblique arrangement".

When the light diffusing element 130 is obliquely arranged, and illumination is performed on the road surface 10 as the illumination target surface in the in-vehicle illumination device 100 as illustrated in FIG. 2, it is necessary to cause the optical axis C of the illumination light to be directed obliquely downward. If the tilt angle ξ illustrated in FIG. 7 is coincident with the irradiation angle θ illustrated in FIG. 2, it is possible to make the direction of a normal line Np' to the point P on the light emitting surface of the light diffusing element 130 coincident with the direction of the optical axis C illustrated in FIG. 2.

Similarly to FIG. 6(b), FIG. 7 is a projection view (projection view on the YZ plane) of the XYZ three-dimensional orthogonal coordinate system viewed from the side, the right side of the drawing, the upper side of the drawing, and the front direction perpendicular to the paper surface of the drawing are set to the Y-axis positive direction, the Z-axis positive direction, and the X-axis positive direction, respectively, and the light diffusing element 130 is arranged on the XZ' plane obtained by tilting the XZ plane of this coordinate system. Therefore, FIG. 7 is a view illustrating a state of the diffused light L130 emitted from the vicinity of the point P when incident light Lin is applied near the point P on the light diffusing element 130 arranged on the XZ' plane.

A diffusion characteristic in the X-axis direction of the light diffusing element 130 illustrated in FIG. 7 is completely the same as the example illustrated in FIG. 6(a). Therefore, when the incident light Lin having the predetermined incident angle (incident angle=0° in this example) is applied, the light diffusing element 130 emits the diffused light L130 that spreads at the first diffusion angle φ1 with the normal line Np (actually the normal line Np' illustrated in FIG. 7) as the center as illustrated in FIG. 6(a) regarding the X-axis direction, and spreads at the second diffusion angle φ2 with the normal line Np' as the center as illustrated in FIG. 7 regarding the Z'-axis direction. Incidentally, the state where the diffused light L130 spreads from one point P is drawn in FIG. 7 for the sake of convenience, but the diffused light L130 is actually emitted from the entire near-field area of the point P corresponding to the beam spot B formed by the light beam emitted as the incident light Lin.

Such a diffraction characteristic can be represented as an angular spatial distribution of the first-order diffracted light intensity illustrated in an upper right frame of FIG. 7. This distribution map illustrates a rectangular diffracted light distribution area E (hatched portion). This diffracted light distribution area E indicates a specific range of the first direction displacement angle θH and the second direction displacement angle θV, a horizontal width thereof corresponds to the first diffusion angle φ1, and a vertical width thereof corresponds to the second diffusion angle φ2.

Both the diffracted light distribution area E in the example (embodiment of the vertical arrangement) illustrated in FIG. 6(c) and the diffracted light distribution area E in the example (embodiment of the oblique arrangement) illustrated in FIG. 7 have the symmetric rectangle with the vertical axis θV as the central axis. This is because the diffused light L130 spreads so as to be symmetrical about the normal line Np as illustrated in FIG. 6(a).

Meanwhile, the diffracted light distribution area E illustrated in FIG. 6(c) is arranged at the position below the origin P (position where the coordinate value θV is a negative value), but the diffracted light distribution area E illustrated in FIG. 7 is arranged around the origin P. This is because the diffused light L130 is directed to the illumination target surface (XY plane) along the normal line Np' even if the second direction displacement angle θV is close to 0° since the light diffusing element 130 itself is obliquely arranged and the normal line Np' thereof is directed to the illumination target surface (XY plane) as illustrated in FIG. 7 in the case of the oblique arrangement, whereas the diffused light L130 is diffracted downward to be directed to the illumination target surface (XY plane) as illustrated in FIG. 6(b) in the embodiment with the vertical arrangement.

The illumination device 100 according to the basic embodiment illustrated in FIG. 3 corresponds to the embodiment that adopts the oblique arrangement, and the light emitting surface (diffractive surface) of the light diffusing element 130 and the optical main surface of the illumination optical system 140 are arranged on the plane parallel to the XZ' plane. Further, the optical axis of the light source 110 is arranged so as to be coincident with the optical axis of the illumination optical system 140, and the diffraction pattern having the diffraction characteristic as illustrated in the upper right frame of FIG. 7 is recorded in the light diffusing element 130. Thus, the light source 110, the scanning member 120, the light diffusing element 130, and the illumination optical system 140 can be arranged on the straight line, and the illumination device having the simple structure as a whole is realized.

<3.4 Characteristic of Light Diffusing Element Used in Present Invention>

Hereinbefore, the angular spatial distribution illustrated in FIG. 6(c) has been exemplified as the diffraction characteristic in the case of vertically arranging the light diffusing element 130 and the angular spatial distribution illustrated in FIG. 7 has been exemplified as the diffraction characteristic in the case of obliquely arranging the light diffusing element 130. Such diffraction characteristics are adopted as the consideration for making it easy to guide the diffused light L130 to the illumination target surface defined on the XY plane. Therefore, it is not necessary to adopt the diffraction characteristics illustrated in FIG. 6(c) and FIG. 7 when implementing the present invention.

For example, the illumination optical system 140 is provided with a function of bending or reflecting the diffused light L130 from the light diffusing element 130 to be guided to the illumination target surface, the illumination optical system 140 can guide the diffused light L130 to the illumination target surface even if the diffused light L130 from the light diffusing element 130 is not emitted toward the illumination target surface. However, if the diffraction characteristics as described above are adopted, the diffused light L130 can be efficiently guided to the illumination target surface even by using a simple collimator lens as the illumination optical system 140 so that the configuration of the illumination optical system 140 can be simplified.

The important characteristic of the light diffusing element 130 used in the present invention is that the anisotropic diffusion is performed such that the first diffusion angle $\varphi 1$ indicating the extent of spread of diffused light in the direction of the first diffusion axis A1 defined on the light emitting surface is different from the second diffusion angle $\varphi 2$ indicating the extent of spread of the diffused light in the direction of the second diffusion axis A2. With such anisotropic diffusion, a unique effect of forming the clear illumination area with suppressed blurring on the illumination target surface is obtained while securing the safety for coherent light (a reason thereof will be described in § 5).

In particular, the embodiments that have been described so far are examples in which axes orthogonal to each other are set as the first diffusion axis A1 and the second diffusion axis A2. For example, in the embodiment of the vertical arrangement illustrated in FIG. 6, the first diffusion axis A1 is the axis parallel to the X axis, the second diffusion axis A2 is the axis parallel to the Z axis, and the both axes are orthogonal to each other. Further, the first diffusion angle $\varphi 1$ is set to be larger than the second diffusion angle $\varphi 2$, and the diffracted light distribution area E becomes the horizontally long rectangle. On the other hand, in the example of the oblique arrangement illustrated in FIG. 7, the first diffusion axis A1 is the axis parallel to the X axis, the second diffusion axis A2 is the axis parallel to the Z' axis, and the both axes are orthogonal to each other. The first diffusion angle $\varphi 1$ is also set to be larger than the second diffusion angle $\varphi 2$, and the diffracted light distribution area E becomes the horizontally long rectangle.

Figure 8:
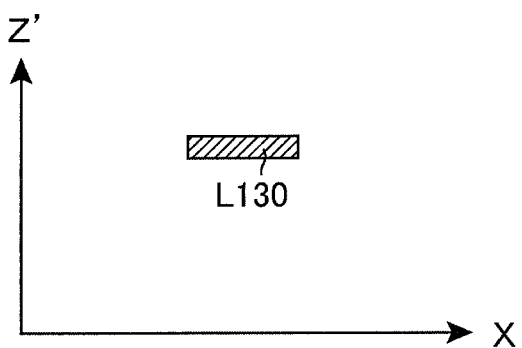
FIG. 8 is a cross-sectional view of the diffused light L130 emitted from the light diffusing element 130 illustrated in FIG. 7 cut along a plane parallel to the XZ' plane.

In this manner, when the diffused light L130 from the light diffusing element 130 having the diffraction characteristic that the diffracted light distribution area E becomes rectangular is cut along a plane orthogonal to a central axis thereof, a rectangular cross section is obtained. FIG. 8 is a cross-sectional view of the diffused light L130 emitted from the light diffusing element 130 illustrated in FIG. 7 cut along the plane parallel to the XZ' plane. As illustrated in FIG. 4, even when the incident surface of the light diffusing element 130 is irradiated with the isotropic beam spot B having the substantially circular shape, the cross section of the diffused light L130 emitted from the light diffusing element 130 becomes rectangular as illustrated in FIG. 8 if the diffraction characteristic of the area where the beam spot B is formed exhibits the distribution map in the upper right frame of FIG. 7. When the diffused light L130 emitted from the light diffusing element 130 illustrated in FIG. 6 is cut along the plane orthogonal to the central axis thereof, the rectangular cross section is also obtained.

Although FIGS. 6(*a*), 6(*b*), and 7 illustrate the diffused light L130 emitted as the diffracted light from the specific point P on the light emitting surface (diffractive surface) of the light diffusing element 130, diffused light is emitted from any position on the light emitting surface in the direction illustrated in FIG. 6(*a*), 6(*b*), or 7 if a predetermined diffraction pattern is formed over the entire surface of the light diffusing element 130 such that the diffused light according to the angular spatial distribution illustrated in the upper right frame of FIG. 6(*c*) or 7 is obtained for any point on the emission surface of the light diffusing element 130.

The embodiment of the vertical arrangement illustrated in FIG. 6 is regarded as an embodiment in which, when the XYZ three-dimensional orthogonal coordinate system is defined, the illumination target surface is set on the XY plane, the light emitting surface of the light diffusing element 130 is located on the plane parallel to the XZ plane, the first diffusion axis A1 is parallel to the X axis, and the second diffusion axis A2 is parallel to the Z axis. Further, the diffused light L130 emitted from the light emitting surface is directed to the XY plane serving as the illumination target surface by the anisotropic diffusion of the light diffusing element 130, and the cross section obtained when this diffused light L130 is cut along the plane orthogonal to its central axis thereof is the rectangle having two sides parallel to the X axis as long sides and the other two sides as short sides.

On the other hand, the embodiment of the oblique arrangement illustrated in FIG. 7 is regarded as an embodiment in which, when the XYZ three-dimensional orthogonal coordinate system and the Z' axis obtained by rotating the Z axis by the predetermined tilt angle $\xi$ with the X axis as the rotation axis are defined, the illumination target surface is set on the XY plane, the light emitting surface of the light diffusing element 130 is located on the plane parallel to the XZ' plane, the first diffusion axis A1 is parallel to the X axis, and the second diffusion axis A2 is parallel to the Z' axis. Further, the diffused light L130 emitted from the light emitting surface is directed to the XY plane serving as the illumination target surface by the anisotropic diffusion of the light diffusing element 130, and the cross section obtained when this diffused light L130 is cut along the plane (plane parallel to the XZ' plane) orthogonal to its central axis thereof is the rectangle having two sides parallel to the X axis as long sides and the other two sides (two sides parallel to the Z' axis) as short sides.

In the example illustrated in FIG. 3, the diffused light L130 having the rectangular cross section in which two sides parallel to the X axis are long sides is obtained by the anisotropic diffusion of the light diffusing element 130, and the rectangular drawing spot D in which two sides parallel to the X axis are long sides and two sides parallel to the Y axis are short sides is projected on the illumination target surface S. If a desired illumination pattern is drawn by scanning the drawing spot D having a large length ratio of the long side to the short side in this manner, it is possible to form the clear illumination area with suppressed blurring on the illumination target surface while securing the safety for coherent light (see § 5).

In the case where the light diffusing element 130 is configured using the diffractive optical element (DOE) or the holographic optical element (HOE), a diffraction grating or an interference fringe may be recorded in each portion of the light diffusing element 130 such that diffracted light having a predetermined angular spatial distribution of first-order diffracted light intensity is emitted as the diffused light L130 when the incident light Lin having a predetermined incident angle is applied.

Specifically, when a displacement angle of diffracted light with respect to the incident light Lin to the predetermined incident point P is expressed by the first direction displacement angle $\theta H$ indicating a displacement in the first diffusion axis direction A1 and the second direction displacement angle $\theta V$ indicating a displacement in the second diffusion axis direction A2 and a distribution graph, which has the first direction displacement angle $\theta H$ as an abscissa axis, the second direction displacement angle θV as an ordinate axis, and a point where the first direction displacement angle=0 and the second direction displacement angle=0 as the origin P, is defined, the diffraction grating or the interference fringe having a diffraction characteristic that the angular spatial distribution of the first-order diffracted light intensity is represented by a diffracted light distribution area E formed of a horizontally long rectangle that is bilaterally symmetric with the ordinate axis as a symmetry axis may be recorded on this distribution graph.

In the embodiment of the vertical arrangement illustrated in FIG. 6, the angular spatial distribution of the first-order diffracted light intensity for each portion of the light diffusing element 130 is represented by the diffracted light distribution area E of the horizontally long rectangle arranged at a position having a predetermined ordinate value (negative value of θV) such that the diffused light L130 is directed to the illumination target surface (XY plane) with the ordinate axis as the center on the distribution graph as illustrated in FIG. 6(c).

On the other hand, in the embodiment of the oblique arrangement illustrated in FIG. 7, the angular spatial distribution of the first-order diffracted light intensity for each portion of the light diffusing element 130 is represented by a diffracted light distribution area E of the horizontally long rectangle arranged with the origin P as the center on the distribution graph as illustrated in the upper right frame of FIG. 7. It is designed such that a vertical width φ2 is sufficiently small as compared to a horizontal width φ1 of the diffracted light distribution area E in the angular spatial distribution illustrated in the upper right frame of FIG. 7, it is sufficient to provide a function of performing diffraction only in the substantially horizontal direction (the direction of the first direction displacement angle θH) to the light diffusing element 130. In this case, the light diffusing element 130 can be configured using the diffraction grating.

Figure 9:
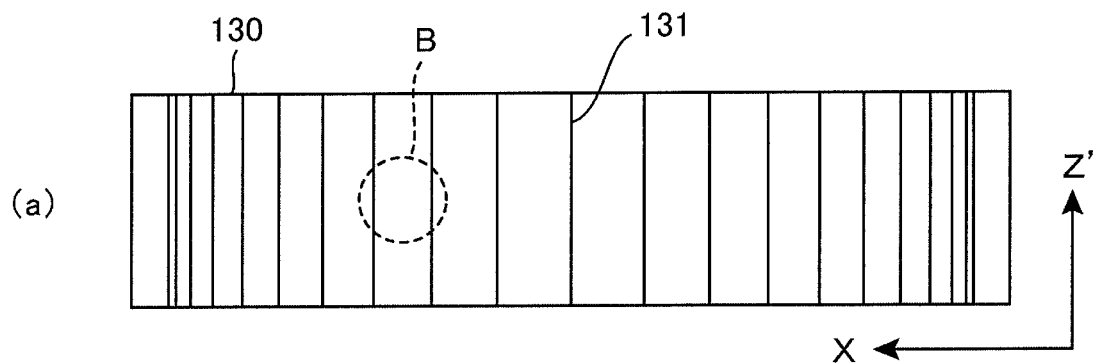
FIG. 9 is a plan view and a side cross-sectional view illustrating an example in which the light diffusing element 130 illustrated in FIG. 7 is formed using a diffraction grating.
Figure 9:
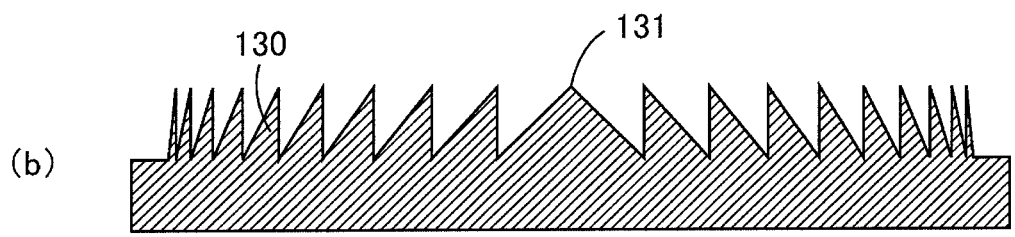

FIG. 9 is a plan view (FIG. 9(a)) and a side cross-sectional view (FIG. 9(b)) illustrating an example in which the light diffusing element 130 illustrated in FIG. 7 is formed using the diffraction grating. This light diffusing element 130 is configured using a diffractive optical element in which the diffraction grating with multiple grid lines 131 parallel to the Z' axis arranged at a plurality of pitches is recorded in a physical structure as illustrated in the drawing. As illustrated in the plan view of FIG. 9(a), all of the grid lines 131 are formed in the direction parallel to the Z' axis, but the pitches thereof vary. In the illustrated example, the grid line pitch in the central portion is large, and the grid line pitch gradually decreases toward the left and right ends.

In addition, as illustrated in the side cross-sectional view of FIG. 9(b), the diffraction grating has a serrated physical uneven structure, and directions of slopes forming a serration are reversed between the right half and the left half. Thus, even if the incident light Lin is applied from the same direction, a direction to be diffracted (whether the positive direction or the negative direction of the X axis) is different between the right half and the left half. In addition, the pitch of the grid lines also varies, a diffraction angle in the X-axis direction also varies. As a result, if the diffraction grating having such a physical structure is used as the light diffusing element 130, the incident light Lin can be diffracted within a predetermined range in the X-axis direction (within the first diffusion angle φ1 illustrated in FIG. 6(a)).

The light diffusing element 130 illustrated in FIG. 9 does not have a function of diffracting the incident light Lin in the Z'-axis direction, but the incident light Lin to the light diffusing element 130 is actually emitted as the beam spot B having the area to a certain extent as indicated by a dashed circle in FIG. 9(a), and thus, the diffused light L130 from the light diffusing element 130 becomes light that spreads to a certain extent in the Z'-axis direction. Incidentally, the pitch of the grid line 131 is drawn to be enlarged as compared to a dimension of the beam spot B for convenience of the description in FIG. 9, but the actual pitch of the grid line is about a dimension of a wavelength of light, and multiple grid lines having various pitches are included in the beam spot B. Accordingly, the incident light Lin applied as the beam spot B is diffracted at various diffraction angles in the X-axis direction and spreads within the first diffusion angle φ1.

Although the embodiment in which the light diffusing element 130 is configured using the diffraction grating has been described as above with reference to FIG. 9, it becomes possible to provide diffraction characteristics with a higher degree of freedom if the light diffusing element 130 is configured using the holographic optical element (HOE). For example, if the light diffusing element 130 is configured using the holographic optical element such that individual portions generate reproduction images of rectangular surfaces at predetermined positions, respectively, it is possible to emit the diffused light L130 having the rectangular cross section in an arbitrary direction.

For example, If an interference fringe configured to generate the rectangular diffused light spot G(t2) as a hologram reproduction image is recorded near the incident point P(t2) of the light diffusing element 130 in the example illustrated in FIG. 3, the rectangular hologram reproduction image is obtained at the position of the diffused light spot G(t2) illustrated in the drawing when the scanning beam L130(t2) is emitted, as reproduction illumination light, near the incident point P(t2) at the scanning time point t2. In short, it is only necessary to record a hologram in the light diffusing element 130, the hologram having a diffraction characteristic so as to diffuse the incident light greatly in the direction of the first diffusion axis A1 and diffuse the incident light little (for example, diffusion about the beam spot B) in the direction of the second diffusion axis A2 intersecting the direction of the first diffusion axis A1.

Incidentally, the light diffusing element 130 having such a function of generating the rectangular hologram reproduction image can be created by, for example, an optical method of arranging a diffusion plate having a rectangular surface at the position of the diffused light spot G(t2) in FIG. 3, arranging a photosensitive medium (blank hologram recording material) at the position of the light diffusing element 130 in FIG. 3, applying a beam which is the same as the scanning beam L130(t2) as reference light, and recording an interference fringe generated by object light and the reference light from the diffusion plate in the photosensitive medium. However, it is preferable to create the light diffusing element 130 using a computer generated hologram (CGH) method for practical use.

If the CGH method is used, it is unnecessary to prepare a diffusion plate to generate the object light, a light source to illuminate the diffusion plate, an optical system to form an interference fringe, a photosensitive medium to record the interference fringe, and the like, and it is possible to perform the entire interference fringe recording process by calculation on a computer. Thus, the interference fringe having an arbitrary diffraction characteristic can be generated with favorable reproducibility at low cost by a simple procedure. For example, when the substantially circular area is irradiated with coherent light as the isotropic beam spot B as illustrated in FIG. 4, it is sufficient to calculate information on an interference fringe to perform anisotropic diffusion such that the diffused light L130 having the rectangular cross section as illustrated in FIG. 8 is emitted using the computer and to record the interference fringe obtained by the calculation in a hologram recording medium.

The light diffusing element 130 created using the CGH method is referred to as the holographic optical element in which CGH having the interference fringe obtained by calculation using the computer is recorded in a physical structure. Since such a method of creating the holographic optical element using the CGH method is a known technique, the detailed description thereof will be omitted here.

§ 4. Formation of Illumination Area

Here, a description will be given in detail regarding a process of irradiating the illumination target surface S (XY plane) with the diffused light L130 emitted from the light diffusing element 130 through the illumination optical system L140 to form the drawing spot D and scanning the drawing spot D to form the illumination area LA having a predetermined shape on the illumination target surface S in the illumination device 100 illustrated in FIG. 3.

The diffused light L130 emitted from each position of the light diffusing element 130 has the rectangular cross section as illustrated in FIG. 8. Further, the illumination optical system 140 is arranged such that its optical axis is orthogonal to the XZ' axis. Therefore, the diffused light spot G formed at the position of the illumination optical system 140 also has a rectangular shape similar to the cross section of the diffused light L130 as illustrated in FIG. 3. In the embodiment illustrated in FIG. 3, the illumination optical system 140 is configured using a collimator lens (one convex lens), and the light emitting surface of the light diffusing element 130 is arranged at a front focal position of the collimator lens.

Figure 10:
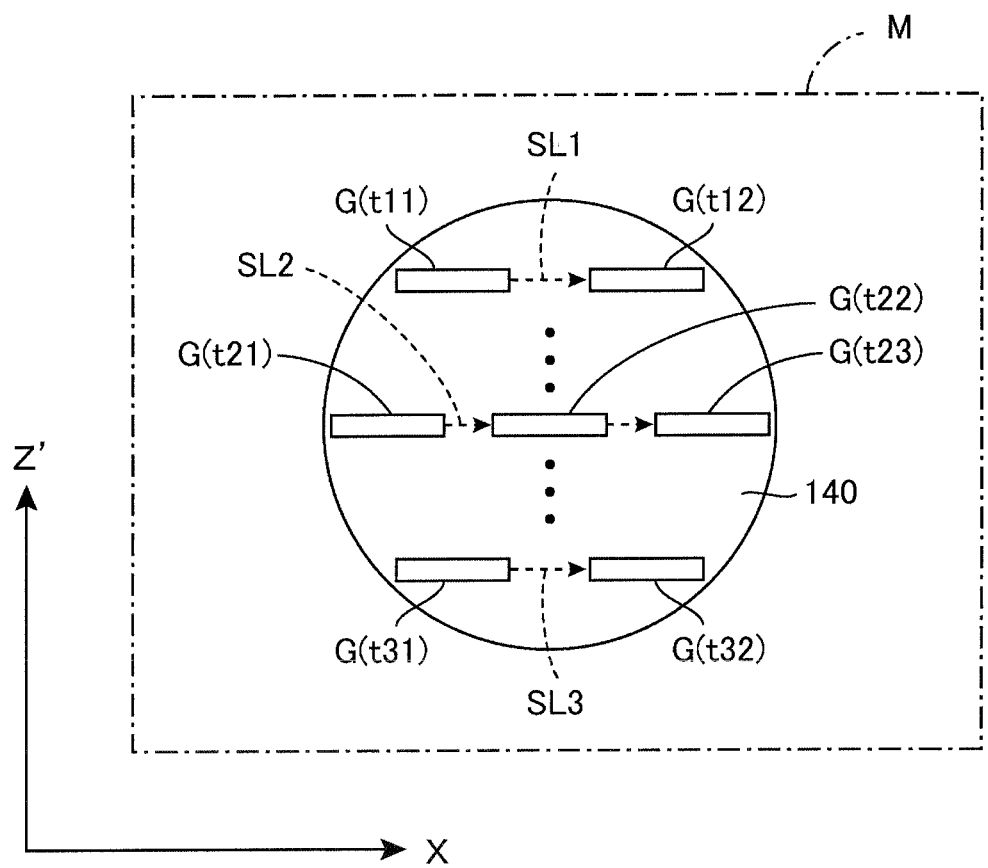
FIG. 10 is a plan view illustrating a movement state of a diffused light spot G formed by the diffused light L130 incident on an illumination optical system 140 when scanning illustrated in FIG. 4 has been performed.

As illustrated in FIG. 4, the beam spot B moves on the light diffusing element 130 with the scanning by the scanning member 120. Thus, the diffused light L130 emitted from the light diffusing element 130 also moves, and the diffused light spot G formed at the position of the illumination optical system 140 also moves. FIG. 10 is a plan view illustrating a movement state of the diffused light spot G formed by the diffused light L130 incident on the illumination optical system 140 when the scanning illustrated in FIG. 4 has been performed, and illustrates a state where rectangular diffused light spots G(t11) to G(t32) are formed in association with scanning time points t11 to t32 illustrated in FIG. 4.

Incidentally, the illumination optical system 140 is configured using a lens, and an incident surface thereof is a curved surface in the embodiment illustrated herein. Therefore, even if a cross section of the diffused light L130 is the rectangle as illustrated in FIG. 8, a spot formed on the incident surface (curved surface) of the lens does not become an accurate rectangle. Therefore, for the sake of convenience, a virtual projection plane M orthogonal to the optical axis of the illumination optical system 140 is defined at a front surface position of the illumination optical system 140 (lens), and a spot projected on the virtual projection plane M by the diffused light L130 is defined as the diffused light spot G in the present application.

A frame drawn by a one-dot chain line in FIG. 10 indicates this virtual projection plane M. The virtual projection plane M is arranged immediately before the illumination optical system 140 (lens), and is orthogonal to the optical axis of the illumination optical system 140. All the illustrated rectangular diffused light spots G(t11) to G(t32) are located on the virtual projection plane M. In addition, all cross sections of the diffused light L130 emitted from arbitrary positions of the light diffusing element 130 become a rectangle having two sides parallel to the X axis as long sides and the other two sides as short sides as illustrated in FIG. 8. Therefore, each of the diffused light spots G(t11) to G(t32) illustrated in FIG. 10 is also a rectangle having two sides parallel to the X axis as long sides and the other two sides as short sides.

A movement locus of the diffused light spot G illustrated in FIG. 10 corresponds to a movement locus of the beam spot B illustrated in FIG. 4. The illustrated example is an example in which raster scan is performed, and the diffused light spot G moves two-dimensionally along the scan lines SL1, SL2, SL3, and so on. Incidentally, FIG. 10 is a view for conceptually illustrating the movement of the diffused light spot G in conjunction with the scanning of FIG. 4, and the positions of the diffused light spots G(t11) to G(t32) are not necessarily accurate.

In short, in the embodiment illustrated herein, when the virtual projection plane M orthogonal to the optical axis of the illumination optical system 140 is defined at the front surface position of the illumination optical system 140, the rectangular diffused light spot G having the pair of long sides and the pair of short sides is formed on the virtual projection plane M by the diffused light L130 from the light diffusing element 130 at each scanning time point.

The illumination device 100 illustrated in FIG. 3 corresponds to the embodiment of "oblique arrangement of light diffusing element" described in § 3.3. In this embodiment of "oblique arrangement of light diffusing element", when the XYZ three-dimensional orthogonal coordinate system and the Z' axis obtained by rotating the Z axis by the predetermined tilt angle $\xi$ with the X axis as the rotation axis are defined, the light diffusing element 130 is arranged on the plane parallel to the XZ' plane, the illumination target surface S is set on the XY plane, the first diffusion axis A1 is parallel to the X axis, and the second diffusion axis A2 is parallel to the Z' axis. In addition, the illumination optical system 140 is arranged such that its optical axis is orthogonal to the XZ' axis.

Thus, if the virtual projection plane M parallel to the XZ' plane is defined at the front surface position of the illumination optical system 140, the diffused light L130 emitted from each position of the light diffusing element 130 forms the rectangular diffused light spot G having the pair of long sides parallel to the X axis and the pair of short sides parallel to the Z' axis on the virtual projection plane M at each scanning time point. All the diffused light spots G(t11) to G(t32) illustrated in FIG. 10 are the rectangle having the pair of long sides parallel to the X axis and the pair of short sides parallel to the Z' axis.

Figure 11:
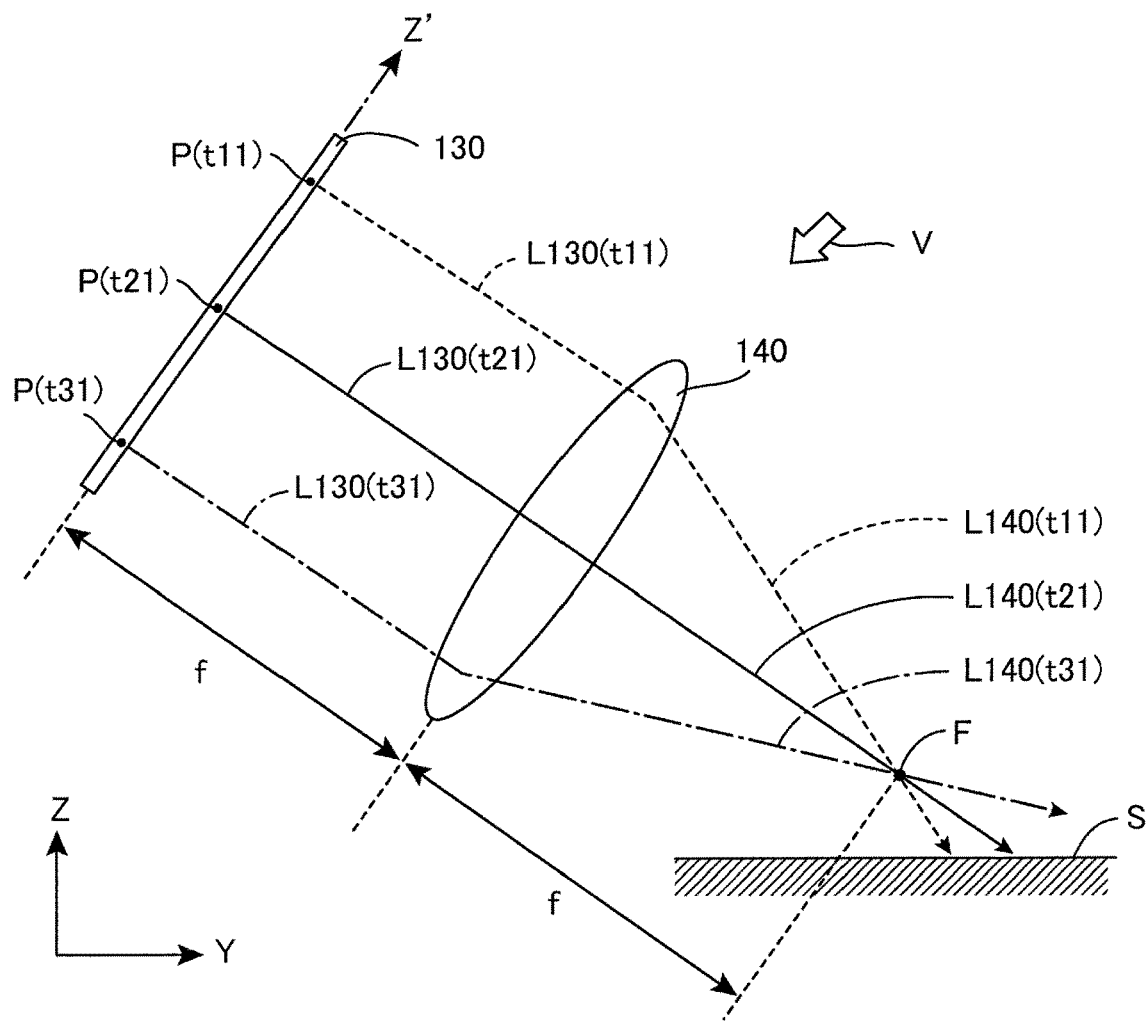
FIG. 11 is a side view illustrating an example of an optical path in which the diffused light L130 emitted from the light diffusing element 130 in the illumination device 100 illustrated in FIG. 3 reaches an illumination target surface S through the illumination optical system 140.

FIG. 11 is a side view illustrating an example of an optical path in which the diffused light L130 obtained from the light diffusing element 130 in the illumination device 100 illustrated in FIG. 3 reaches the illumination target surface S through the illumination optical system 140. The illumination optical system 140 serves a role of guiding the diffused light L130 (coherent light) anisotropically diffused by the light diffusing element 130 to the illumination target surface S. Ideally, it is preferable to arrange the light diffusing element 130 at the front focal position of the illumination optical system 140. The example illustrated in FIG. 11 is an example in which such an ideal arrangement has been performed, and a distance between the diffusion surface (diffractive surface) of the light diffusing element 130 and the main surface of the illumination optical system 140 (lens) is set to coincide with a focal length f of the illumination optical system 140.

Meanwhile, the illumination target surface S is usually located farther than a back focal position F of the illumination optical system 140. For example, in the in-vehicle illumination device as illustrated in FIG. 2, the illumination target surface S is set on a considerably far side on the road surface 10. In FIG. 11, an optical path of diffused light L130(t11) emitted from a point P(t11) of the light diffusing element 130 at a scanning time point t11 is indicated by a dashed line, an optical path of diffused light L130(t21) emitted from a point P(t21) at a scanning time point t21 is indicated by a solid line, and an optical path of diffused light L130(t31) emitted from a point P(t31) at a scanning time point t31 is indicated by a one-dot chain line. Therefore, illumination light L140(t11) indicated by a dashed line, illumination light L140(t21) indicated by a solid line, and illumination light L140(t31) indicated by a one-dot chain line reach the illumination target surface S at the scanning time point t11, the scanning time point t21, and the scanning time point t31, respectively.

Incidentally, each optical path illustrated in FIG. 11 indicates the central axis of the diffused light L130 or the illumination light L140. In practice, the diffused light L130 and the illumination light L140 are light having a predetermined width. In the embodiment illustrated herein, the illumination optical system 140 is configured using the collimator lens, and functions as a collimator that collimates the diffused light L130 from the light diffusing element 130. An incident position of the diffused light L130 with respect to the collimator lens 140 differs depending on the respective scanning time points t11 to t31 as illustrated in FIG. 10.

However, the collimator lens 140 collimates the incident diffused light L130 and emits the collimated diffused light L130 regardless of the position of the collimator lens 140 where the diffused light L130 is incident since the light diffusing element 130 is arranged at the front focal position of the collimator lens 140. Therefore, for example, the diffused light L130(t11) indicated by the dashed line in the drawing becomes light spreading at a predetermined diffusion angle, but is collimated when passing through the illumination optical system 140, and the illumination light L140(t11) traveling toward the illumination target surface S becomes the collimated light. Thus, it is possible to form the drawing spot D in which the substantially rectangular shape is maintained even when the illumination target surface S is set on the considerably far side.

Figure 12:
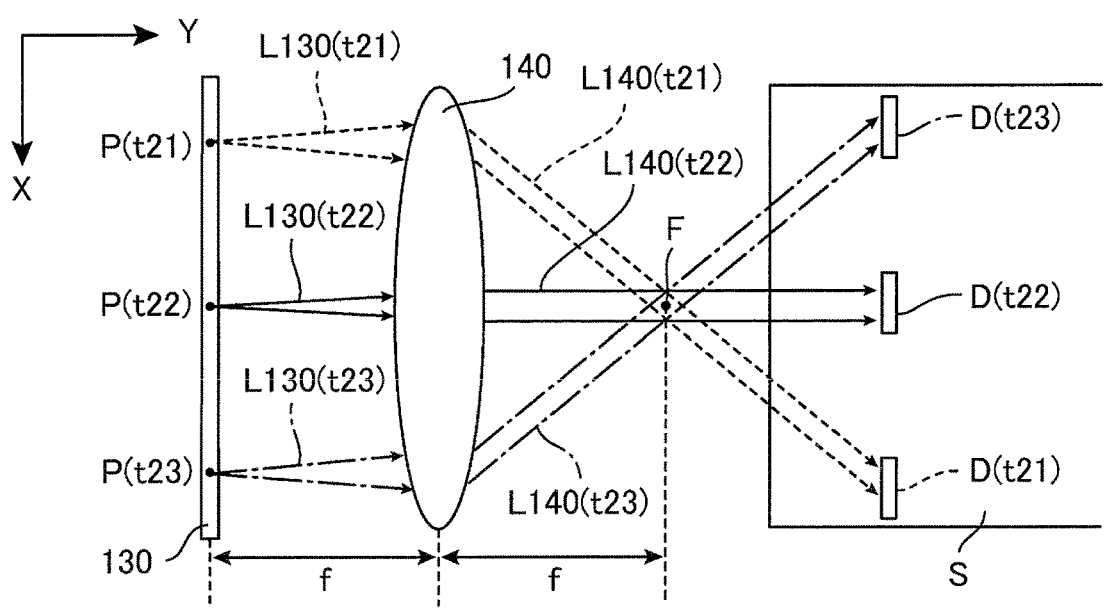
FIG. 12 is a projection view of non-orthogonal projection illustrating a state where each constituent element illustrated in FIG. 11 is observed from a gaze direction V.

FIG. 12 is a projection view illustrating a state where the respective constituent elements illustrated in FIG. 11 are observed from a gaze direction V (see the upper right of FIG. 11). In this drawing, the optical path of the diffused light L130(t21) emitted from the point P(t21) of the light diffusing element 130 at the scanning time point t21 is indicated by a dashed line, an optical path of diffused light L130(t22) emitted from a point P(t22) at a scanning time point t22 is indicated by a solid line, and an optical path of diffused light L130(t23) emitted from a point P(t23) at a scanning time point t23 is indicated by a one-dot chain line. Therefore, on the illumination target surface S, the illumination light L140(t21) indicated by a dashed line reaches at the scanning time point t21 to form a drawing spot D(t21), illumination light L140(t22) indicated by a solid line reaches at the scanning time point t22 to form a drawing spot D(t22), and illumination light L140(t23) indicated by a one-dot chain line reaches at the scanning time point t23 to form a drawing spot D(t23).

In this manner, the traveling direction of the illumination light L140 emitted from the collimator lens 140 differs depending on which position of the collimator lens 140 the diffused light L130 has entered. The position of the drawing spot D formed on the illumination target surface S changes in the Y-axis direction when the incident position of the diffused light L130 is changed in the Z'-axis direction as illustrated in FIG. 11, and the position of the drawing spot D formed on the illumination target surface S is changed in the X-axis direction when the incident position of the diffused light L130 is changed in the X-axis direction as illustrated in FIG. 12.

Since the cross section of the diffused light L130 is the rectangle having two sides parallel to the X axis as long sides as illustrated in FIG. 8, the spread of the diffused light L130 in the X-axis direction becomes more significant than the spread in the Z'-axis direction. Thus, the optical paths of the diffused light L130(t21), the diffused light L130(t22), and the diffused light L130(t23) are drawn as optical paths each having the spread in FIG. 12. Since the illumination optical system 140 is configured using the collimator lens as described above, the illumination light L140(t21), the diffused light L140(t22), and the diffused light L140(t23) that have passed through the illumination optical system 140 are collimated and reach the illumination target surface S. As a result, the drawing spot D formed on the illumination target surface S also becomes rectangular as illustrated in FIG. 12.

Although a formation process of the illumination area LA in the embodiment of "oblique arrangement of light diffusing element" described in § 3.3 has been described as above using the illumination device 100 illustrated in FIG. 3 as an example, a formation process of the illumination area LA in the embodiment of "vertical arrangement of light diffusing element" described in § 3.2 is substantially the same.

In the embodiment of "vertical arrangement of light diffusing element", when the XYZ three-dimensional orthogonal coordinate system is defined as illustrated in FIG. 6, the light diffusing element 130 is arranged on the plane parallel to the XZ plane, the illumination target surface S is set on the XY plane, the first diffusion axis A1 is parallel to the X axis, and the second diffusion axis A2 is parallel to the Z axis. At this time, the illumination optical system 140 is preferably arranged such that the optical axis thereof is parallel to the central axis of the diffused light L130 emitted from a predetermined point P on the emission surface of the light diffusing element 130 (for example, the center point of the emission surface). More preferably, the illumination optical system 140 may be arranged such that the optical axis thereof is coincident with the central axis of the diffused light L130 emitted from the predetermined point P on the emission surface of the light diffusing element 130.

In this case, when the virtual projection plane M orthogonal to the optical axis is defined at the front surface position of the illumination optical system 140, the diffused light L130 from the light diffusing element 130 forms the rectangular diffused light spot G having a pair of sides parallel to the X axis as long sides and a pair of other sides as short side on the virtual projection plane M at each scanning time point, which is similar to the example illustrated in FIG. 10. Therefore, the rectangular drawing spot D can be also formed on the illumination target surface S.

In this manner, the incident position of the coherent light incident on the illumination optical system 140 (collimator lens) changes in response to the scanning of the scanning member 120 in the illumination device 100 illustrated in FIG. 3. Further, the traveling direction of the coherent light emitted from the collimator lens 140 also changes depending on the incident position and incident angle of the coherent light on the collimator lens 140. As a result, the position of the drawing spot D formed on the illumination target surface S also changes. Therefore, the drawing spot D can be moved on the illumination target surface S to form the illumination area LA having an arbitrarily shaped pattern by controlling the scanning of the scanning member 120 using the scan control unit 150.

Although the example in which one collimator lens (convex lens) is used as the illumination optical system 140 has been described as above, it is a matter of course that a collimating optical system obtained by combining a plurality of lenses may be used as the illumination optical system 140. In addition, the illumination optical system 140 is not necessarily configured using a lens, and may be configured using a curved mirror such as a concave mirror that serves similar functions. Even when the concave mirror is used as the illumination optical system 140, coherent light reflected by the concave mirror travels in a substantially parallel direction and reaches the illumination target surface S if the light diffusing element 130 is arranged at a focal position of the concave mirror.

§ 5. Operational Effects Unique to Present Invention

Figure 13:
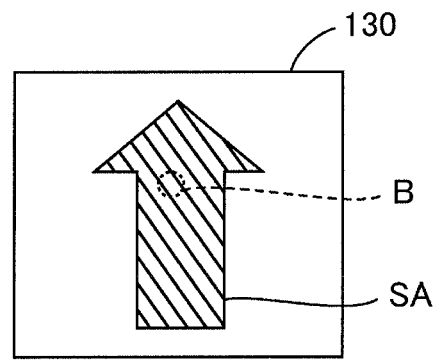
FIG. 13 is a plan view illustrating a scan area SA on the light diffusing element 130 when drawing an arrow pattern.

As described above, the illumination device 100 illustrated in FIG. 3 can draw the illumination area LA having an arbitrary shape on the illumination target surface S by moving the drawing spot D. It is sufficient to perform scanning such that only the inside (hatched portion) of the arrow-shaped scanning area SA on the light diffusing element 130 is irradiated with the beam spot B as illustrated in FIG. 13 in order to draw the illumination area LA having an arrow pattern on the illumination target surface S. As described above, such scanning can be performed by the raster scan or the vector scan.

The movement of the drawing spot D on the illumination target surface S is interlocked with the movement of the beam spot B on the light diffusing element 130. Therefore, a desired figure can be drawn by the drawing spot D on the illumination target surface S if the scan control unit 150 prepares desired scan pattern data and controls the scanning of the scanning member 120 according to this scan pattern such that the desired figure is drawn by the beam spot B on the light diffusing element 130.

A first advantage of the present invention is that the illumination area LA having a high resolution can be obtained since the illumination area LA having the desired shape is drawn by moving the drawing spot D formed by the diffused light L130 (diffused light obtained by the optical phenomenon) from the light diffusing element 130 on the illumination target surface S. Hereinafter, this first advantage will be described in more detail with reference to a first comparative example using a phosphor.

Figure 14:
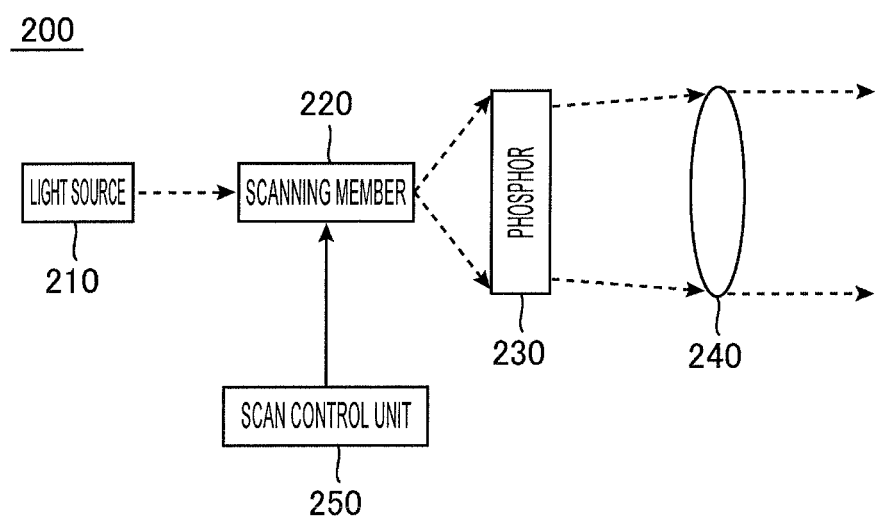
FIG. 14 is a diagram illustrating a basic configuration of an illumination device 200 according to a first comparative example of the present invention.

FIG. 14 is a diagram illustrating a basic configuration of an illumination device 200 according to the first comparative example of the present invention. In this illumination device 200, a phosphor 230 is arranged instead of the light diffusing element 130 in the illumination device 100, and a light source 210, a scanning member 220, the phosphor 230, an illumination optical system 240, and a scan control unit 250 are provided as illustrated in the drawing.

The light source 210 is, for example, a laser light source and generates a coherent light beam. The light beam is scanned by the scanning member 220 under control of the scan control unit 250 and emitted to the phosphor 230. In the phosphor 230, a molecule of a portion irradiated with the light beam is once excited by absorbing the light beam, and then, generates wavelength-converted fluorescence when returning to the ground state again. The fluorescence generated by the phosphor 230 is guided to the illumination target surface S by the illumination optical system 240 as diffused light to form an illumination area LA of a predetermined shape.

In the illumination device 200 according to the first comparative example, the illumination area LA having a desired shape can be formed by temporarily controlling the scanning of the scanning member 220 using the scan control unit 250. However, the diffused light emitted from the phosphor 230 (not diffused light obtained by an optical phenomenon but diffuse light emitted as fluorescence from the excited molecule) spreads greatly as compared to the light beam emitted to the phosphor 230, and thus, a size of a drawing spot formed on the illumination target surface S increases even if a diameter of the light beam emitted to the phosphor 230 is small, and it becomes difficult to form the illumination area LA having a high resolution.

In particular, when the illumination device 200 according to the first comparative example is used as the in-vehicle illumination device as illustrated in FIG. 2, a diameter of the light generated as fluorescence from the phosphor 230 is stretched in the Y-axis direction (depth direction as viewed from a driver) on a road surface serving as the illumination target surface S, and blurring in the Y-axis direction is hardly overlooked.

In addition, when the phosphor 230 is irradiated with coherent light having a small spot diameter, there are problems such as burning of the phosphor 230 and deformation of an edge of the phosphor 230 caused by heat, and a pattern of the illumination area LA formed on the illumination target surface S is not clear and blurring occurs.

In this manner, the blurring occurs in the pattern of the illumination area LA formed on the illumination target surface S in the illumination device 200 according to the first comparative example, and there is a problem that the phosphor 230 is likely to deteriorate. On the other hand, in the illumination device 100 according to the present invention, the diffused light L130 is obtained by the optical phenomenon such as the diffraction phenomenon, and thus, the drawing spot D formed on the illumination target surface S becomes much clearer than that in the illumination device 200 according to the first comparative example so that the illumination area LA having a high resolution can be obtained. In addition, the problem of deterioration of the phosphor 230 does not occur.

Meanwhile, a second advantage of the present invention is that it is possible to form the clear illumination area LA with suppressed blurring in the illumination target surface S while securing the safety for coherent light since the light diffusing element 130 performs the anisotropic diffusion such that the extent of spread of diffused light in the direction of the first diffusion axis A1 (in the above-described embodiment, the first diffusion angle $\varphi 1$) is different from the extent of spread of diffused light in the direction of the second diffusion axis A2 (in the above-described embodiment, the second diffusion angle $\varphi 2$). Hereinafter, the second advantage will be described in more detail with reference to a second comparative example using the light diffusing element 135 that performs isotropic diffusion in two axial directions.

Figure 15:
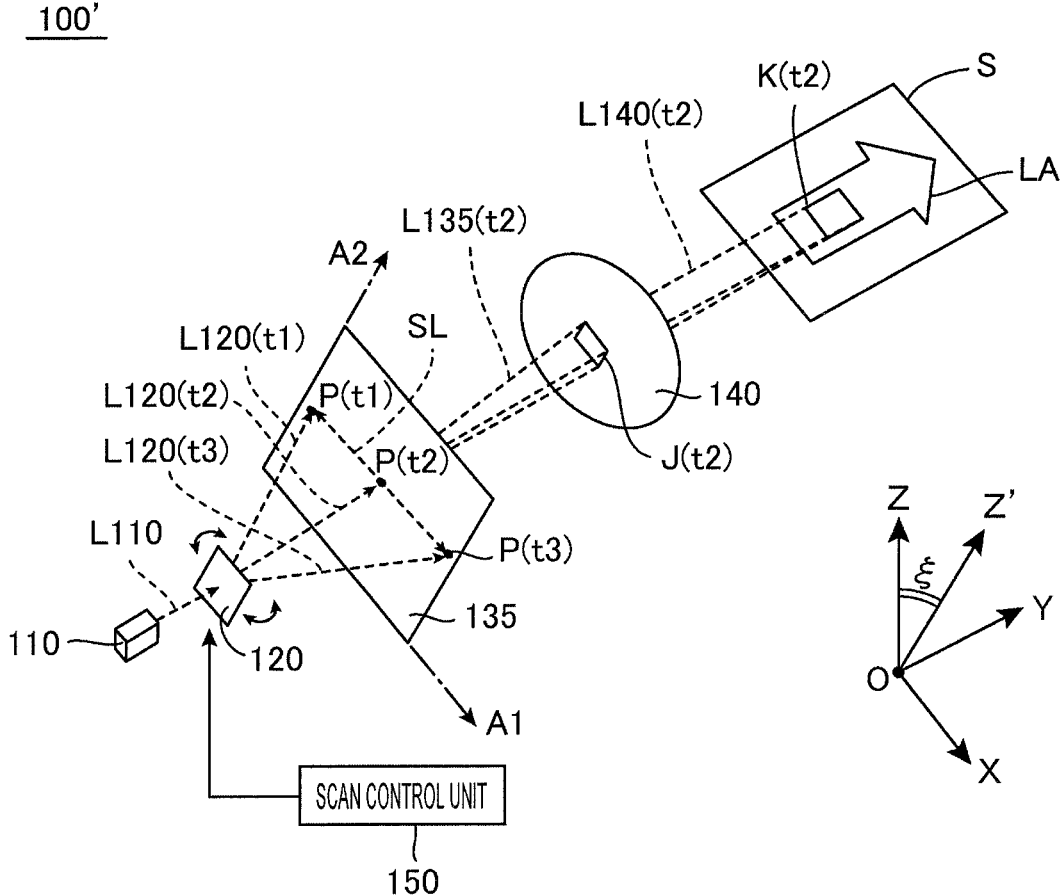
FIG. 15 is a perspective view (a part of which is a block diagram) illustrating a basic configuration of an illumination device 100' according to a second comparative example of the present invention.

FIG. 15 is a perspective view illustrating a basic configuration of an illumination device 100' according to the second comparative example of the present invention. In the illumination device 100', a light diffusing element 135 is arranged instead of the light diffusing element 130 in the illumination device 100 illustrated in FIG. 3, and a difference between the two is only this point. Here, optical paths at the scanning time point t2 illustrated in FIGS. 3 and 15 will be taken as an example to compare the both.

As described so far, the light diffusing element 130 illustrated in FIG. 3 performs the anisotropic diffusion such that the extent of spread of diffused light in the direction of the first diffusion axis A1 is different from the extent of spread of diffused light in the direction of the second diffusion axis A2, and thus, the cross section of the diffused light L130 is the rectangle having two sides parallel to the X axis as long sides as illustrated in FIG. 8. Thus, the diffused light spot G(t2) formed at the position of the illumination optical system 140 is also the rectangle having two sides parallel to the X axis as long sides as illustrated in FIG. 3. Therefore, the drawing spot D(t2) formed on the illumination target surface S also has the rectangular shape according to the diffused light spot G(t2). Incidentally, the dimension of the drawing spot D(t2) in the Y-axis direction depends on the irradiation angle θ illustrated in FIG. 2, and thus, the drawing spot D(t2) is not necessarily the rectangle having two sides parallel to the X axis as long sides (there is a case where two sides parallel to the Y axis become long sides depending on the irradiation angle θ).

On the other hand, the light diffusing element 135 illustrated in FIG. 15 performs isotropic diffusion such that an extent of spread of diffused light in the direction of the first diffusion axis A1 and an extent of spread of diffused light in the direction of the second diffusion axis A2 are the same. Thus, a cross section of illustrated diffused light L135(t2) is a square, and a diffused light spot J(t2) formed at a position of the illumination optical system 140 is also a square. Therefore, a drawing spot K(t2) formed on the illumination target surface S also becomes a rectangle corresponding to the diffused light spot J(t2).

As a result, substantial differences between FIG. 3 and FIG. 15 are only that the diffused light spot G(t2) in the former becomes the diffused light spot J(t2) in the latter and that the drawing spot D(t2) in the former becomes the drawing spot K(t2) in the latter. An important point of the both is that the diffused light spot J(t2) becomes the square while the diffused light spot G(t2) becomes the rectangle having two sides parallel to the X axis as long sides. A difference in an aspect ratio of the rectangle appears as a difference in an aspect ratio of the drawing spot D(t2) and the drawing spot K(t2) formed on the illumination target surface S.

The drawing spot D(t2) or the drawing spot K(t2) is obtained by projecting the diffused light spot G(t2) or the diffused light spot J(t2) from an oblique direction, and is subjected to collimation by the illumination optical system 140, and thus, forms the rectangle on the illumination target surface S. Further, the aspect ratio of the drawing spot D(t2) and the drawing spot K(t2) depends on the irradiation angle θ illustrated in FIG. 2 (the rectangle is stretched more in the Y-axis direction as θ decreases). Therefore, regarding the drawing spot D(t2) and the drawing spot K(t2), whether two sides parallel to the X axis become long sides or two sides parallel to the Y axis become the long sides is a matter that is determined depending on the irradiation angle θ, and is hardly stated in general.

However, a dimension of the drawing spot D(t2) in the Y-axis direction is smaller than a dimension of the drawing spot K(t2) in the Y-axis direction if compared at least with the same irradiation angle θ. In this manner, the decrease in the dimension of the drawing spot in the Y-axis direction contributes to reduction of blurring of the illumination area LA drawn by movement of the drawing spot. The reason thereof will be described hereinafter.

Figure 16:
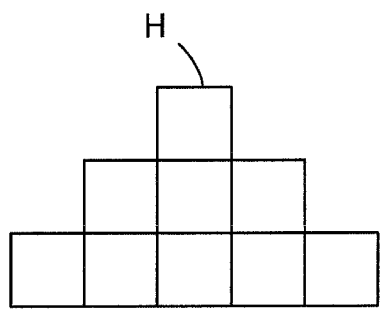
FIG. 16 is a plan view illustrating pattern formation using pixels H and pattern formation by drawing spots K in comparison.
Figure 16:
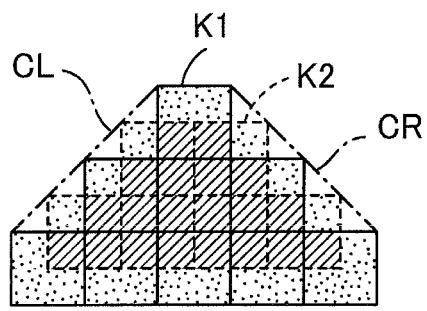

In general, a figure pattern displayed on a display device is formed of a set of pixels, and the resolution of the displayed figure pattern greatly depends on a size of the pixel. FIG. 16(*a*) illustrates an example in which a figure pattern formed of an isosceles triangle is drawn by a set of pixels H indicated by solid squares. In this example, a size of the pixel H is considerably larger than a size of the figure pattern to be drawn, and thus, a figure having a low resolution, which is far from the original isosceles triangle, is drawn. It is necessary to make the size of the pixel H to be used smaller in order to increase the resolution and draw a more accurate isosceles triangle.

Meanwhile, when a figure pattern is drawn on the illumination target surface S using a drawing spot as in the illumination device according to the present invention, a situation is slightly different as compared to the above-described case where the figure pattern is formed using the pixels H. For example, in FIG. 16(*b*), when a figure pattern is formed only by a set of drawing spots K1 indicated by solid squares, an isosceles triangle having a low resolution is obtained similarly to the example illustrated in FIG. 16(*a*). However, the individual drawing spots can be formed at arbitrary positions on the illumination target surface S by scanning of the scanning member 120, which is different from the pixel. Therefore, it is also possible to form drawing spots K2 at positions indicated by dashed squares in FIG. 16(*b*), for example. Here, the drawing spot K2 is obtained by shifting the drawing spot K1 vertically and horizontally each by half a pitch.

Therefore, if the drawing spot K2 indicated by the dashed square is further added to the drawing spot K1 indicated by the solid square in FIG. 16(*b*), a figure pattern having a double resolution can be formed with respect to the figure pattern formed by the set of the pixels H illustrated in FIG. 16(*a*) Although the drawing spot K1 and the drawing spot K2 obtained by shifting the drawing spot K1 by the half pitch are illustrated in FIG. 16(*b*) for convenience of the description, the drawing spot can be continuously moved on the illumination target surface S, in practice. Therefore, if appropriate two-dimensional scanning is performed by the scan control unit 150, it becomes possible to draw a figure pattern having a left oblique contour line CL and a right oblique contour line CR as indicated by one-dot chain lines in FIG. 16(*b*), and the isosceles triangle having a more accurate shape is obtained.

As a result, when the method of drawing a predetermined figure pattern as the set of pixels H as illustrated in FIG. 16(*a*) and the method of drawing a predetermined figure pattern by scanning the drawing spot K by illumination light as illustrated in FIG. 16(*b*) are compared, the figure pattern having a higher resolution is obtained in the latter than in the former even if the pixel H and drawing spot K have the same size. This is an essential difference between the pixel H and the drawing spot K.

However, there arises a potential problem that blurring occurs in a contour portion in the figure pattern drawn by the drawing spot K. A reason thereof can be easily understood if considering a luminance difference of each part when the figure pattern is formed by the drawing spot K1 indicated by the solid line and the drawing spot K2 indicated by the dashed line as illustrated in FIG. 16(*b*).

A contour area hatched with dots in FIG. 16(*b*) is an area formed only of the drawing spots K1, but an internal area hatched with oblique lines is an area where the drawing spots K1 and the drawing spots K2 overlap each other. In other words, the contour area hatched with dots is illuminated only when illumination light is at the position of the drawing spot K1, but the internal area hatched with oblique lines is illuminated not only when the illumination light is at the position of the drawing spot K1 but also when the illumination light is at the position of the drawing spot K2.

In practice, the drawing spot K moves continuously, and thus, a gentle luminance difference from a position of a contour line toward the internal area occurs near the contour line of the formed figure pattern, and this gentle luminance difference is recognized as blurring of the contour line. As illustrated in FIG. 16(a), blurring of a contour line does not occur due to such a circumstance in the figure pattern formed of the set of pixels H.

Figure 17:
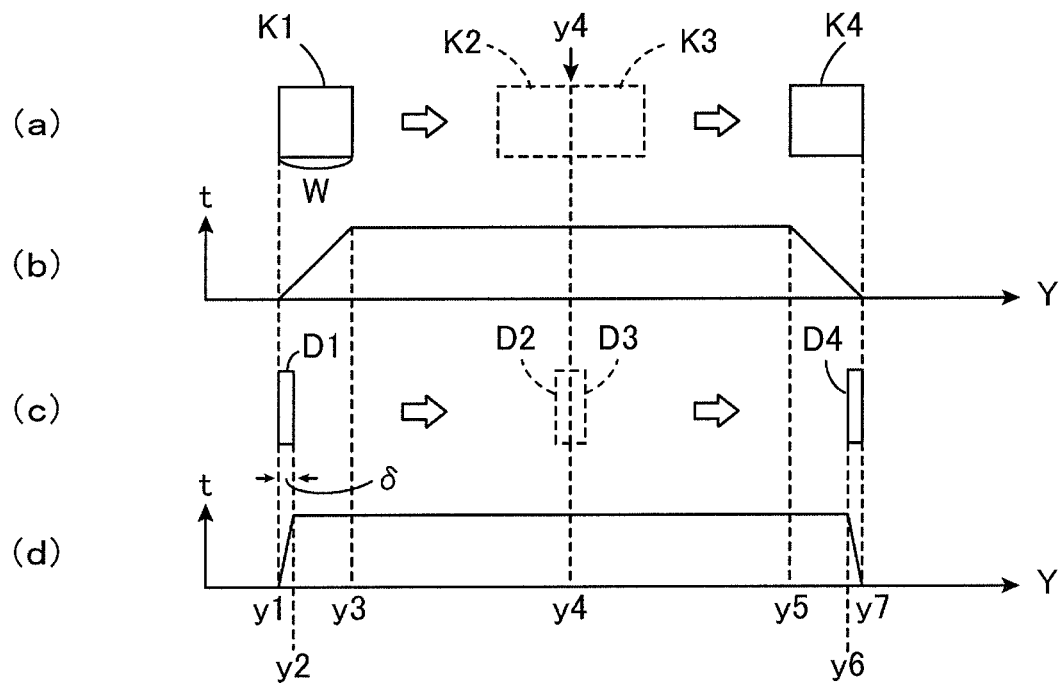
FIG. 17 is a view for describing a reason why blurring occurs in a contour portion of a pattern when the pattern formation using the drawing spots K is performed.

FIG. 17 is a view for describing the reason why the blurring occurs in the contour portion of the figure pattern when the figure pattern is formed using the drawing spots. FIG. 17(a) illustrates a state where the Y axis is set as the horizontal axis and a square drawing spot K is moved from left to right on the illumination target surface S along the Y axis as indicated by a white arrow. A drawing spot K1 indicated by a solid square indicates a drawing spot at a start position, drawing spots K2 and K3 indicated by dashed squares indicate drawing spots at midway positions, and a drawing spot K4 indicated by a solid square indicates a drawing spot at an end position.

FIG. 17(b) is a graph illustrating a cumulative irradiation time t of illumination light at each position on the Y axis when the drawing spot is moved from K1 to K4 as illustrated in FIG. 17(a). The cumulative irradiation time t of the illumination light rises gently at the left end and falls gently at the right end as illustrated in the drawing. Each length of such rising and falling sections is coincident with a width W of the drawing spot K in the Y-axis direction. Since the cumulative irradiation time t of illumination light at a specific position on the Y axis corresponds to a luminance value of an illumination at the specific position, the luminance value changes gently to cause blurring of the contour line in the vicinity of the left end and in the vicinity of the right end in the illustrated example.

Meanwhile, FIG. 17(c) illustrates a state where the drawing spot D is moved from left to right on the illumination target surface S along the Y axis as indicated by a white arrow similarly to FIG. 17(a) However, the drawing spot K illustrated in FIG. 17(a) is the square-shaped drawing spot having the width W in the Y-axis direction, but a drawing spot D illustrated in FIG. 17(c) is a rectangle-shaped drawing spot having a width δ in the Y-axis direction. Here, a drawing spot D1 indicated by a solid rectangle indicates a drawing spot at a start position, drawing spots D2 and D3 indicated by dashed rectangles indicate drawing spots at midway positions, and a drawing spot D4 indicated by a solid rectangle indicates a drawing spot at an end position.

FIG. 17(d) is a graph illustrating a cumulative irradiation time t of the illumination light at each position on the Y axis when the drawing spot is moved from D1 to D4 as illustrated in FIG. 17(c). Even in this case, the cumulative irradiation time t of the illumination light rises at the left end and falls at the right end, and each length of such rising and falling sections is coincident with the width δ of the drawing spot D in the Y-axis direction. It is a matter of course that a luminance value changes to cause blurring of a contour line in the vicinity of the left end and in the vicinity of the right end.

When FIGS. 17(b) and 17(d) are compared, however, it can be understood that lengths of sections where the blurring of the contour line occurs are different. That is, when a Y-coordinate is followed in the order of coordinate values y1 to y7, the cumulative irradiation time t in the graph of FIG. 17(b) gradually increases in a section between the coordinate values y1 and y3, becomes flat from the coordinate values y3 to y5 through y4, and gradually decreases in a section between the coordinate values y5 and y7. On the other hand, the cumulative irradiation time t in the graph of FIG. 17(d) gradually increases in a section between the coordinate values y1 and y2, becomes flat from the coordinate values y2 to y6 through y3, y4, and y5, and gradually decreases in a section between the coordinate values y6 and y7.

Therefore, when using the drawing spot K having the width W in the Y-axis direction as illustrated in FIG. 17(a), an area where the blurring of the contour line occurs is the section having the width W between the coordinate values y1 and y3 and the section having the width W between the coordinate values y5 and y7. However, when using the drawing spot D having the width δ in the Y-axis direction as illustrated in FIG. 17(c), an area where the blurring of the contour line occurs is the section having the width δ between the coordinate values y1 and y2 and the section having the width δ between the coordinate values y6 and y7. In this manner, the width of the drawing spot in relation to the Y-axis direction is an important parameter that determines the amount of blurring that occurs near the contour line.

Here, when the illumination device 100' according to the second comparative example illustrated in FIG. 15 is compared to the illumination device 100 according to the present invention illustrated in FIG. 3, it can be understood that the drawing spot K having the large width in the Y-axis direction is formed in the former as illustrated in FIG. 17(a), whereas the drawing spot D having the smaller width in the Y-axis direction is formed in the latter as illustrated in FIG. 17(c). Therefore, it can be understood that the amount of blurring that occurs near the contour lines formed at ends in the Y-axis direction is reduced in the illumination device 100 according to the present invention as compared to the illumination device 100' according to the second comparative example.

In addition, when compared to a case where a beam scanning mode by the scanning member 120 is set to be the same, a center position of the drawing spot K1 illustrated in FIG. 17 substantially is coincident with a center position of the drawing spot D1 and a center position of the drawing spot K4 substantially is coincident with a center position of D4 in relation to the position on the Y axis Thus, an actual position of the drawing spot K1 is slightly close to the left of the illustrated position, and the position of the drawing spot K4 is slightly close to the right of the illustrated position. Therefore, when the beam scanning mode by the scanning member 120 is the same, an edge of the end in the Y-axis direction is slightly stretched in the Y-axis direction in the illumination area LA (arrow figure) illustrated in FIG. 15 as compared to that in the illumination area LA (arrow figure) illustrated in FIG. 3, and blurring occurs in this portion due to the above-described factor. In other words, the drawing spot D having the small width in the Y-axis direction is used, instead of the drawing spot K, in the illumination device 100 according to the present invention, and thus, it is possible to obtain the effect of reducing the amount of such blurring that occurs at the edge of the end in the Y-axis direction.

Incidentally, both the drawing spot K and the drawing spot D have the same width in the X-axis direction, and thus, there is no difference between the illumination device 100 and the illumination device 100' regarding the amount of blurring that occurs near a contour line formed at an end in the X-axis direction. However, when being used as the in-vehicle illumination device as illustrated in FIG. 2, a measure against the blurring of the contour line formed at the end in the Y-axis direction is much more important than a measure against the blurring of the contour line formed at the end in the X-axis direction. This is because the figure pattern forming the illumination area 20 is presented in the state of being stretched in the Y-axis direction since the illumination area 20 is formed on the road surface 10 on the considerably front side as illustrated in FIG. 2 in the case of the in-vehicle illumination device.

For example, in the example illustrated in FIG. 1, the illumination area 20 formed of the arrow figure pattern is observed on the front side to driver's eyes, and the actual illumination area 20 formed on the road surface 10 has a lateral width (width in the X-axis direction) of at most about 1 m, for example, but a vertical width (width in the Y-axis direction) reaches up to 10 m in the case of the example illustrated in FIG. 2. Since the figure pattern projected on the road surface 10 is stretched in the Y-axis direction in this manner, the blurring near the contour lines of the ends (a distal end portion and a root portion of the arrow) in the Y-axis direction is emphasized. In particular, the blurring of the contour line generated at the end in the Y-axis direction becomes extremely noticeable when observed from the pedestrian 30 near the illumination area 20.

Due to such a reason, the measure for the blurring of the contour line formed at the end in the Y-axis direction is extremely important in the case of an illumination device used in an environment where the irradiation angle θ with respect to the illumination target surface S is extremely small, such as the in-vehicle illumination device. In the illumination device 100 illustrated in FIG. 3, the diffused light L130 having the rectangular cross section with two sides parallel to the X axis as long sides and the other two sides as short sides is generated as illustrated in FIG. 8, and the drawing spot D is formed on the illumination target surface S by the diffused light L130, and thus, it is possible to effectively suppress the blurring of the contour line formed at the end in the Y-axis direction as compared with the illumination device 100' illustrated in FIG. 15.

In addition, the diffused light L130 used in the illumination device 100 illustrated in FIG. 3 has the rectangle cross section with two sides parallel to the X axis as long sides, and thus, the extent of spread of diffused light in the X-axis direction (the direction of the first diffusion axis A1) can be made sufficiently large. For example, in the example illustrated in FIG. 6, the second diffusion angle φ2 indicating the extent of spread of diffused light with respect to the Z-axis direction (the direction of the second diffusion axis A2) is suppressed to be small (see FIG. 6(b)), whereas the first diffusion angle φ1 indicating the extent of spread of diffused light with respect to the X-axis direction (the direction of the first diffusion axis A1) is set to be sufficiently large (see FIG. 6(a)). This is important in terms of securing the safety for coherent light.

That is, when the first diffusion angle φ1 is suppressed to be small together with the second diffusion angle φ2, the spread of diffused light in the X-axis direction can be also decreased so that there is a merit that it is possible to sufficiently take the measure against the blurring of the contour line formed at the end of the illumination area LA in the X-axis direction. However, coherent light having a high energy density is directly emitted onto the illumination target surface S so that there arises a serious problem that safety is compromised.

For example, in the case of illuminating the road surface 10 using the in-vehicle illumination device as illustrated in FIG. 1, there is a possibility that coherent light toward the road surface 10 is directly incident on eyes of the pedestrian 30 when the pedestrian 30 gazes at the direction of the illumination device 100 incorporated in the vehicle 40. In this case, there is a possibility that the eyes of the pedestrian 30 are damaged if an energy density of the coherent light emitted from the illumination device 100 as illumination light is high. Since the anisotropic diffusion is performed by the light diffusing element 130 in the illumination device 100 according to the present invention, the first diffusion angle φ1 can be set to be sufficiently large while suppressing the second diffusion angle φ2 to be small. Thus, an energy density of the light beam emitted from the light source 110 is dispersed in the X-axis direction according to the first diffusion angle φ1 so that it is possible to secure the sufficient safety.

As described above, the coherent light beam L110 from the light source 110 is scanned by the scanning member 120, and is incident to the light receiving surface of the light diffusing element 130 in the illumination device 100 according to the present invention. Further, the incident scanning beam L120 is emitted as the diffused light L130, passes through the illumination optical system 140, and forms the drawing spot D on the illumination target surface S. Here, when assuming that the scan control unit 150 controls scanning of the light beam according to the arrow-shaped figure pattern, the illumination area LA having the arrow shape is formed by the moving the drawing spot (D) on the illumination target surface (S). Since the light diffusing element 130 performs the anisotropic diffusion that spreads the incident light beam mainly in the X-axis direction, the spread of the diffused light L130 is biased in one direction.

The basic characteristic of the present invention that "the light diffusing element 130 performs the anisotropic diffusion" in this manner becomes an extremely important characteristic in terms of obtaining the effect that the clear illumination area with suppressed blurring on the illumination target surface S is obtained while securing the safety for coherent light. That is, it is possible to decrease the energy density of the coherent light emitted as the illumination light by performing the illumination using the diffused light L130 sufficiently spread in the direction of the first diffusion axis A1, and to secure the sufficient safety for practical use. Furthermore, it is possible to suppress the blurring of the contour line of the illumination area LA drawn by the drawing spot D and to form the clear illumination area by forming the drawing spot D using the diffused light L130 that is limited in the spread in the direction of the second diffusion axis A2.

It is a matter of course that the blurring suppression effect based on the above configuration is advantageous for the contour line formed at the end in relation to the Y-axis direction, but is not advantageous for the contour line formed at the end in relation to the X-axis direction. However, the blurring suppression effect based on the present invention is an extremely practical effect since the measure against the blurring of the contour line formed at the end in the Y-axis direction is much more important than the measure against the blurring of the contour line formed at the edge in the X-axis direction in the case of the illumination device used in the environment where the irradiation angle θ with respect to the illumination target surface S is extremely small, such as the in-vehicle illumination device, as described above.

Incidentally, several experiments have been conducted to obtain a ratio of spread of diffused light in the direction of the first diffusion axis A1 relative to spread of diffused light in the direction of the second diffusion axis A2 (a value of $\varphi 1/\varphi 2$ when the first diffusion angle is $\varphi 1$ and the second diffusion angle is $\varphi 2$, or a value of width/height of the rectangle forming the cross section of the diffused light L130 illustrated in FIG. 8) regarding a case where a general semiconductor laser device having a function that can form the illumination area LA with a luminance, which is sufficiently recognizable by a human even in the daytime, on an outdoor road surface is used as the light source 110. As a result, it has been found out that it is possible to form the clear illumination area LA with suppressed blurring can be formed on the illumination target surface S while securing the safety for coherent light if the ratio is set to be two or more. For practical use, it is preferable to set this ratio to five or more, and it is more effective if this ratio is set to ten or more. Therefore, when the illumination device according to the present invention is used as the illumination device that forms the illumination area LA on the outdoor road surface, such as the in-vehicle illumination device, the ratio may be set to two or more, preferably five or more, and more preferably ten or more.

In addition, when the drawing spot K (t2) illustrated in FIG. 15 and the drawing spot D(t2) illustrated in FIG. 3 are compared, the latter has a finer interference pattern in relation to the Y-axis direction than the former, and thus, it is also possible to obtain a secondary effect that speckles are reduced depending on conditions.

§ 6. Various Modifications

Here, a description will be given regarding several modifications of the illumination device 100 according to the basic embodiment of the present invention that has been described so far. In addition, the respective modifications illustrated below can be implemented in combination as long as no contradiction arises.

<6.1 Modification in which Light Lighting Control is Performed>

Figure 18:
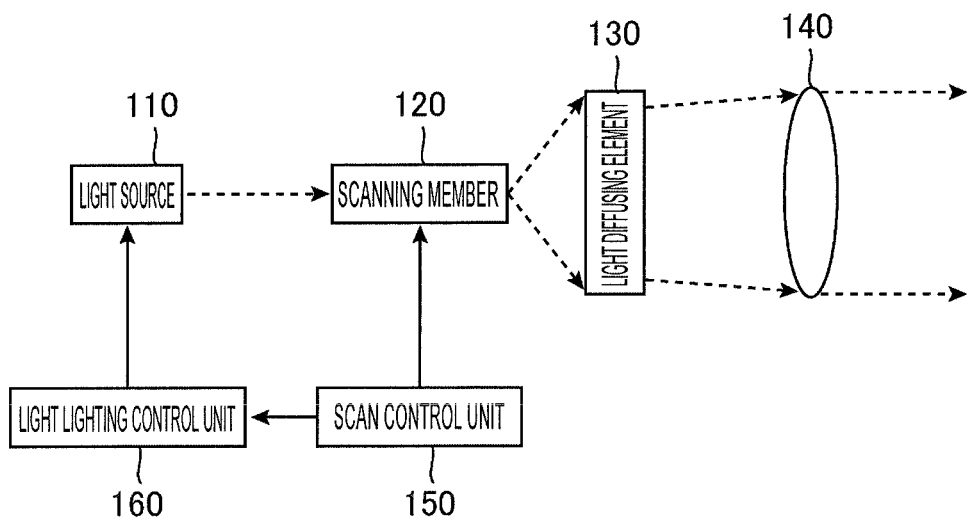
FIG. 18 is a block diagram illustrating a basic configuration of an illumination device 300 with a light lighting control function according to a modification of the present invention.

FIG. 18 is a block diagram illustrating a basic configuration of an illumination device 300 with a light lighting control function according to a modification of the present invention. The illumination device 300 is obtained by adding a light lighting control unit 160 to the respective constituent elements of the illumination device 100 illustrated in FIG. 3. Therefore, the light source 110, the scanning member 120, the light diffusing element 130, the illumination optical system 140, and the scan control unit 150 illustrated in FIG. 18 are substantially the same constituent elements as the constituent elements having the same reference signs, respectively, used for the illumination device 100 illustrated in FIG. 3.

In the illumination device 300, the newly added light lighting control unit 160 is a constituent element that controls turning on and off of the light source 110. Here, the turning on and off control by the light lighting control unit 160 is performed in conjunction with the scan control of the scan control unit 150, and an illumination area LA having a predetermined shape is formed by a set of drawing spots D, obtained when the light source 110 is turned on, on the illumination target surface S.

Specifically, a signal indicating a current scanning state by the scanning member 120 is applied from the scan control unit 150 to the light lighting control unit 160, and the light lighting control unit 160 performs control to turn on or off the light source 110 based on this signal. That is, the light lighting control unit 160 controls the turning on or off of the light source 110 in synchronization with a scanning position of the scanning member 120. For example, the light lighting control unit 160 performs control to turn on the light source 110 only when the scanning member 120 causes the scanning beam L120 to be directed in a predetermined direction. With such lighting control, an illumination pattern of arbitrary shape and size can be formed on the illumination target surface S, and arbitrary information can be displayed as the illumination area LA.

In the case of the illumination device 100 according to the basic embodiment that has been described so far, it is necessary to perform scanning on the light diffusing element 130 such that the beam spot B moves only within the scanning area SA of the arrow shape as illustrated in FIG. 13 in order to form the illumination area LA of the arrow shape as illustrated in FIG. 3. On the other hand, it is sufficient to constantly perform raster scan on the entire surface as illustrated in FIG. 4 as the scanning of the beam spot B on the light diffusing element 130 in the case of the illumination device 300 illustrated in FIG. 18. When such full scanning is performed, only the rectangular illumination area LA can be formed on the illumination target surface S in the illumination device 100, but the illumination area LA having an arbitrary shape can be formed by the lighting control of the light lighting control unit 160 in the illumination device 300.

For example, in the example illustrated in FIG. 13, when the raster scan is performed on the entire surface of the light diffusing element 130, the beam spot B sequentially moves row by row from an upper left corner position to a lower right corner position of the light diffusing element 130. If the control to turn on the light source 110 is performed only when the beam spot B is positioned within the scanning area SA (hatched arrow figure) by the light lighting control unit 160, the illumination area LA having an arrow shape is formed on the illumination target surface S.

As a result, in the illumination device 300 illustrated in FIG. 18, it is sufficient to grant the scan control unit 150 the function of applying the signal indicating the current scanning position to the light lighting control unit 160 while constantly executing the scan control so as to perform the full raster scan as illustrated in FIG. 4, and to grant the light lighting control unit 160 the function of performing the control to turn on or off the light source 110 in synchronization with the scanning position at each time point such that the illumination area LA having a desired shape is formed on the illumination target surface S. If the lighting control of the light source 110 is performed in this manner, it becomes possible to form a plurality of illumination areas LA formed of enclaves on the illumination target surface S, and it is also possible to display a message formed of a plurality of characters.

<6.2 Modification in which Color Display is Performed>

Figure 19:
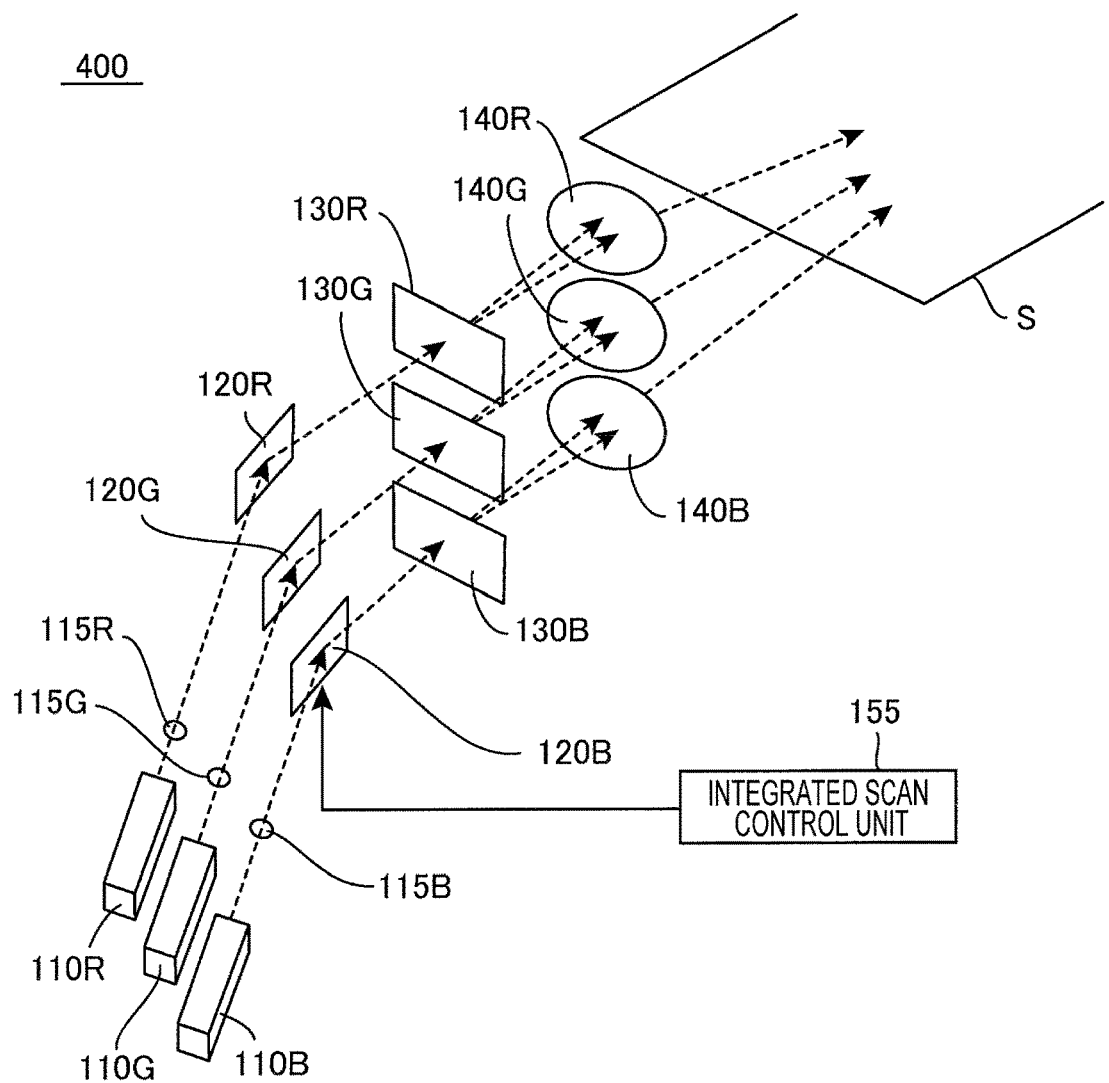
FIG. 19 is a perspective view (a part of which is a block diagram) illustrating a basic configuration of a color illumination device 400 according to a modification of the present invention.

FIG. 19 is a perspective view (a part of which is a block diagram) illustrating a basic configuration of a color illumination device 400 according to a modification of the present invention. The color illumination device 400 is configured to be capable of forming an illumination area LA having an arbitrary color on the illumination target surface S by preparing three sets of the illumination devices 100 illustrated in FIG. 3. Hereinafter, these three sets of illumination devices will be referred to as a first illumination device, a second illumination device, and a third illumination device.

The respective constituent elements of the three sets of illumination devices included in the color illumination device 400 are basically the same as the respective constituent elements of the illumination device 100 illustrated in FIG. 3, and reference signs R, G, and B are added to ends of the reference signs of the corresponding constituent elements in FIG. 3 as reference signs of the individual constituent elements in FIG. 19. Here, constituent elements with the reference sign R are constituent elements of the first illumination device to form a red illumination area, constituent element with the reference sign G are constituent elements of the second illumination device to form a green illumination area, and constituent elements with the reference sign B are constituent elements of the third illumination device to form a blue illumination area.

Incidentally, a scan control unit 150R of the first illumination device, a scan control unit 150G of the second illumination device, and a scan control unit 150B of the third illumination device may be provided separately, but an integrated scan control unit 155 in which these control units are integrated is provided in the embodiment illustrated in FIG. 19. The integrated scan control unit 155 has a function of performing scan control of scanning members 120R, 120G, and 120B for the respective colors. In addition, a red light source lens 115R, a green light source lens 115G, and a blue light source lens 115B are newly added in the illumination device 400 illustrated in FIG. 19 although not used in the illumination device 100 illustrated in FIG. 3. These light source lenses serve roles of enhancing the parallelism of light beams emitted from the respective light sources.

The three light sources 110R, 110G, and 110B emit coherent light beams of different wavelength bands. That is, the light source 110R of the first illumination device generates a red light beam, the light source 110G of the second illumination device generates a green light beam, and the light source 110B of the third illumination device generates a blue light beam. The light beams of the respective colors generated in this manner are scanned by the scanning members 120R, 120G, and 120B for the respective colors through the light source lenses 115R, 115G, and 115B for the respective colors, and then, are incident to light diffusing elements 130R, 130G, and 130B for the respective colors.

Since a red scanning beam is applied, a diffraction pattern suitable for light with a red wavelength is recorded in the light diffusing element 130R of the first illumination device. Similarly, a diffraction pattern suitable for light with a green wavelength is recorded in the light diffusing element 130G of the second illumination device since a green scanning beam is applied, and a diffraction pattern suitable for light with a blue wavelength is recorded in the light diffusing element 130B of the third illumination device since a blue scanning beam is applied.

In this manner, the light diffusing element 130R of the first illumination device forms the red illumination area with red diffused light via a red illumination optical system 140R. Similarly, the light diffusing element 130G of the second illumination device forms the green illumination area with green diffused light via a green illumination optical system 140G, and the light diffusing element 130B of the third illumination device forms the blue illumination area with blue diffused light via a blue illumination optical system 140R. Therefore, the red illumination area, the green illumination area, and the blue illumination area are formed on the illumination target surface S, and color illumination areas of predetermined colors are formed in overlapping portions between the illumination areas of these colors.

A point that the light diffusing elements 130R, 130G, and 130B for the respective colors perform anisotropic diffusion is similar to the basic embodiment that has been described so far. In addition, a point that the illumination optical systems 140R, 140G, and 140B for the respective colors are configured using collimator lenses and a point that the light diffusing elements 130R, 130G, and 130B for the respective colors are arranged at a front focal position are also similar to the basic embodiment that has been described so far. Therefore, the illumination optical systems 140R, 140G, and 140B for the respective colors collimate incident diffused light and emit the collimated light toward the illumination target surface S.

A color of a color illumination area can be changed to any color by adjusting outputs of the three sets of light sources 110R, 110G, and 110B. In addition, when combined with the modification in which the light lighting control is performed, which has been described in § 6.1, it is possible to change a color for each portion of a color illumination area. Although the example in which the light sources that generate the light beams of three colors of red, green, and blue are used as the three sets of light sources 110R, 110G, and 110B has been described in the example illustrated in FIG. 19, the colors of the respective light sources are not limited to these colors, and a light source that generates coherent light other than red, green, and blue may be used, and a color illumination area may be formed by combining four or more colors of light using four or more sets of illumination devices. Alternatively, a plurality of sets of light sources in the same wavelength range may be provided to improve the illumination intensity of the color illumination area.

It is a matter of course that the arrangement of the respective constituent elements illustrated in FIG. 19 is merely an example, and various other arrangements can be used. For example, the three sets of light sources 110R, 110G, and 110B, the three sets of scanning members 120R, 120G, and 120B, the three sets of light diffusing elements 130R, 130G, and 130B, and the three sets of illumination optical systems 140R, 140G, and 140B are arranged to be stacked in the vertical direction in the example illustrated in FIG. 19, but may be arranged side by side in the horizontal direction.

<6.3 Modification Using Reflection Scanning Member>

Figure 20:
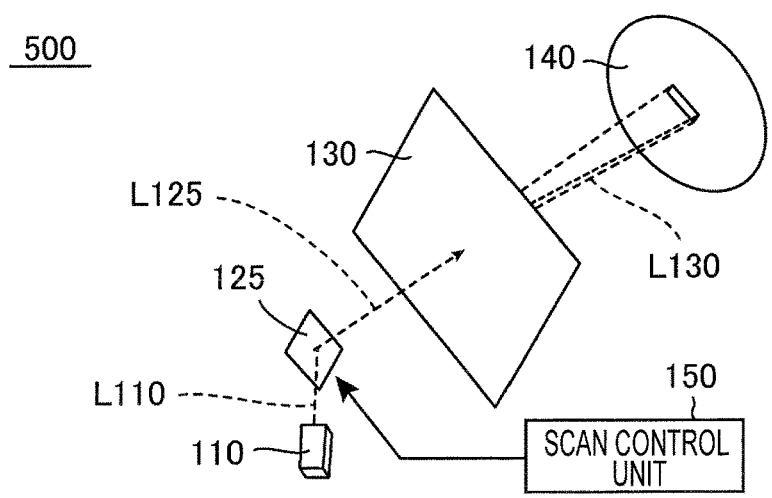
FIG. 20 is a perspective view (a part of which is a block diagram) illustrating an illumination device 500 using a reflection scanning member according to a modification of the present invention.

FIG. 20 is a perspective view illustrating an illumination device using a reflection scanning member according to a modification of the present invention. In an illumination device 500, the scanning member 120 of the illumination device 100 illustrated in FIG. 3 is replaced with a scanning member 125, and the arrangement of the light sources 110 is slightly changed. Therefore, the light source 110, the light diffusing element 130, the illumination optical system 140, and the scan control unit 150 illustrated in FIG. 20 are substantially the same constituent elements as the constituent elements having the same reference signs, respectively, used for the illumination device 100 illustrated in FIG. 3.

The scanning member 120 illustrated in FIG. 3 is the transmission scanning member, and performs scanning by rotating the transmission scanning body that emits light incident on the first surface from the second surface. Therefore, the light beam L110 passes through the transmission scanning body and enters the light diffusing element 130. On the other hand, the scanning member 125 illustrated in FIG. 20 is the reflection scanning member, and includes: a reflection scanning body (a constituent element denoted by reference sign 125 in the drawing) having a reflective surface that reflects and emits the incident light beam L110; and a scanning mechanism (an element constituted by a motor, a gear, and the like) (not illustrated) that rotates and scans this reflection scanning body.

As the reflection scanning body, for example, a reflective mirror, such as a micro electro mechanical systems (MEMS) mirror, can be used. It is possible to change a traveling direction of reflected light beam by rotating the reflective mirror about a predetermined rotation axis by the scanning mechanism. When one-dimensional scanning is performed, the reflection scanning body may be rotated about a rotation axis by the scanning mechanism with an axis parallel to the Z' axis as the rotation axis. The light beam L110 from the light source 110 is reflected by the reflection scanning body, and a reflected scanning beam L125 is directed to the light diffusing element 130.

When two-dimensional scanning is performed, it is sufficient to prepare the scanning mechanism that rotates and scans the reflection scanning body about two axes and to perform scan control to change an incident point of the scanning beam L125 on the light diffusing element 130 two-dimensionally using the scan control unit 150. For example, if the scanning mechanism capable of rotating about a first rotation axis parallel to the Z' axis and rotating about a second rotation axis parallel to the X axis is used, the beam spot B formed on the light diffusing element 130 by the reflected light beam can be moved by the two-dimensional scanning as illustrated in FIG. 4.

<6.4 Modification Using Elemental Diffractive Optical Area>

Figure 21:
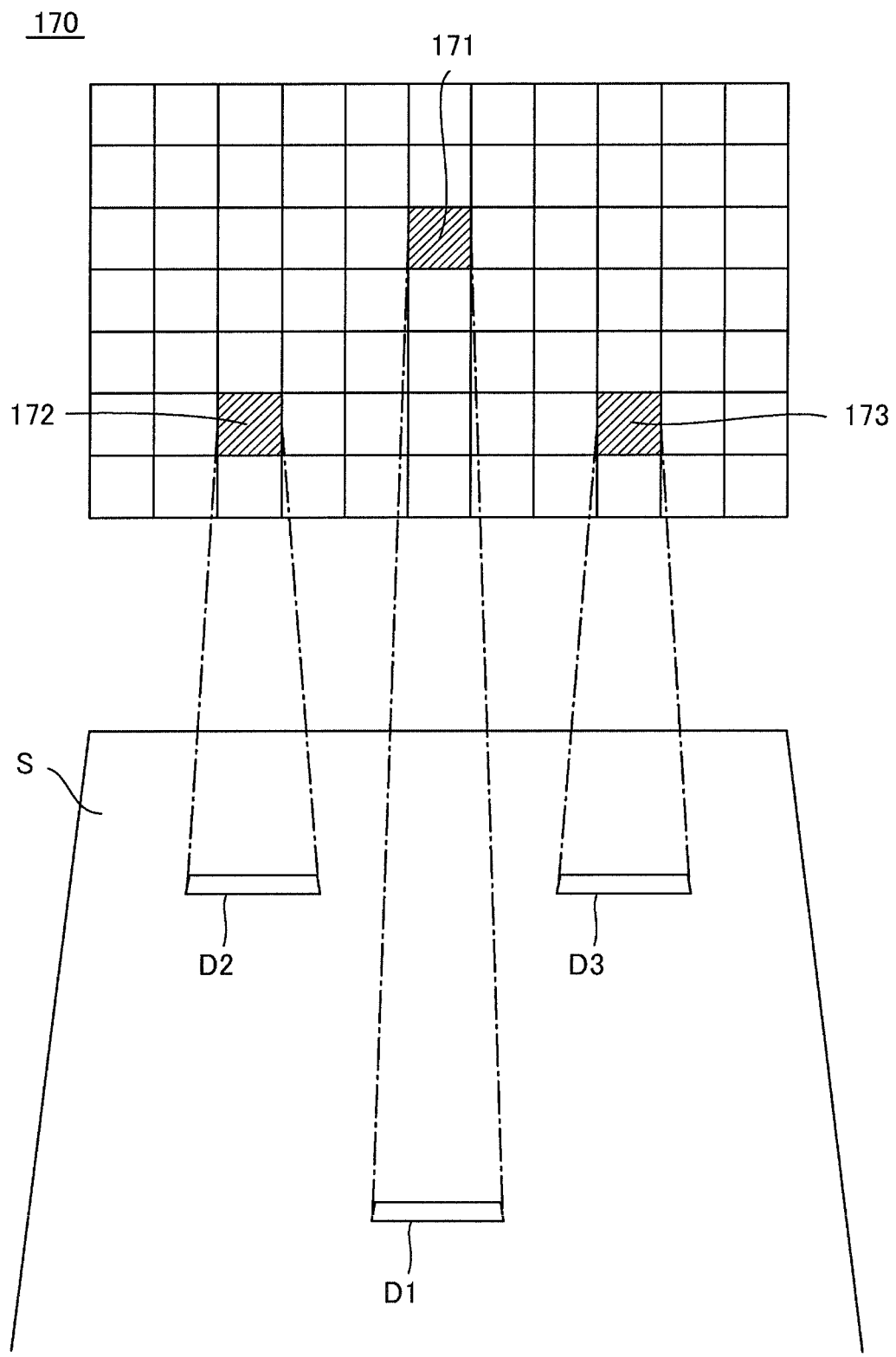
FIG. 21 is a perspective view illustrating a function of a light diffusing element 170 having an elemental diffractive optical area used in a modification of the present invention.

FIG. 21 is a perspective view illustrating a function of a light diffusing element 170 having an elemental diffractive optical area used in a modification of the present invention. As described above, the light diffusing element 130 in the illumination device 100 illustrated in FIG. 3 can be configured using the holographic optical element in which a predetermined diffraction pattern is recorded. The light diffusing element 170 illustrated in FIG. 21 is also an example of the light diffusing element configured using the holographic optical element, but this light diffusing element 170 is divided into a plurality of areas as illustrated in the drawing, and each area functions as an independent hologram. In the case of implementing the modification described herein, it is sufficient to use the light diffusing element 170 illustrated in FIG. 21 instead of the light diffusing element 130 in the illumination device 100 illustrated in FIG. 3.

Here, the individual areas constituting the light diffusing element 170 will be referred to as elemental diffractive optical areas. Beams of diffused light emitted from the individual elemental diffractive optical areas form separate drawing spots D at different positions on the illumination target surface S through the illumination optical system 140 (not illustrated in FIG. 21). For example, diffused light from an elemental diffractive optical area 171 illustrated by hatching in the drawing passes through the illumination optical system 140 (not illustrated) to form a drawing spot D1 on the illumination target surface S. Similarly, diffused light from an elemental diffractive optical area 172 forms a drawing spot D2 on the illumination target surface S, and diffused light from an elemental diffractive optical area 173 forms a drawing spot D3 on the illumination target surface S. The same description applies to the other elemental diffractive optical areas. Incidentally, since collimation is performed by the illumination optical system 140 (not illustrated) in practice, illumination light injected to the illumination target surface S becomes parallel light.

In other words, the independent holograms are recorded in the individual elemental diffractive optical areas, respectively, and these individual holograms have functions of emitting the diffused light that forms the separate drawing spots D at individual positions on the illumination target surface S through an illumination optical system 140 (not illustrated) when receiving the scanning beam L120 from the scanning member 120. For example, the individual hologram recorded in the elemental diffractive optical area 171 has the function of emitting the diffused light that forms the drawing spot D1 on the illumination target surface S through the illumination optical system 140 (not illustrated) when the scanning beam L120 is incident from a predetermined direction.

The exact same diffraction pattern can be recorded in the individual holograms recorded in the respective elemental diffractive optical areas, or mutually different diffraction patterns can be recorded. If the same diffraction pattern is recorded in the respective individual holograms, all the elemental diffractive optical areas have the same diffraction characteristic, but the drawing spots are formed at the different positions on the illumination target surface S since the position on the light diffusing element 170 is different and the incident angle of the scanning beam L120 is also different. It is a matter of course that it is possible to individually adjust the position of the drawing spot formed on the illumination target surface S if a diffraction pattern different for each of individual holograms is recorded.

A back surface of the light diffusing element 170 illustrated in FIG. 21 is irradiated with the scanning beam L120 from the scanning member 120 to form the beam spot B. If two-dimensional scanning is performed by the scanning member 120, the beam spot B moves two-dimensionally on the light diffusing element 170, and predetermined diffused light is emitted from an elemental diffractive optical area at a moving location. For example, when the beam spot B moves to the position of the elemental diffractive optical area 171, the drawing spot D1 illustrated in the drawing is formed on the illumination target surface S.

If a diameter of the beam spot B is larger than a dimension of each elemental diffractive optical area, the beam spot B covers a plurality of adjacent elemental diffractive optical areas at a certain scanning time point. In this case, the drawing spots D are formed at different positions by beams of diffused light from the individual elemental diffractive optical areas, and the plurality of drawing spots D appear on the illumination target surface S. However, no trouble occurs since the illumination area LA having a predetermined shape is formed as a set of the plurality of drawing spots D in the first place.

On the other hand, when the diameter of the beam spot B is smaller than the dimension of each elemental diffractive optical area, the same drawing spot appears on the illumination target surface S as long as the beam spot B remains within the same elemental diffractive optical area. However, the drawing spot appears at another position if the beam spot B moves into the adjacent elemental diffractive optical area, and thus, no trouble occurs.

It is a matter of course that the drawing spot appears at the same position as long as the beam spot B remains in the same elemental diffractive optical area when using the light diffusing element 170 having the elemental diffractive optical areas, and thus, the movement of the drawing spot is not continuous but discrete. However, if a scanning speed by the scan control unit 150 is set to be fast to a certain level, there is no change in terms that the illumination area LA formed on the illumination target surface S is visually recognized as a single area by human eyes even if the drawing spot moves discretely, and no particular trouble occurs. Incidentally, when the light diffusing element 170 having the elemental diffractive optical areas is used, the illumination area LA is formed by superimposition of beams of coherent light from the respective elemental diffractive optical areas, and thus, it is possible to obtain a merit that the safety for coherent light is further improved and speckles are hardly visible.

It is a matter of course that the diffused light emitted from each elemental diffractive optical area is obtained by anisotropic diffusion so as to make the extent of spread of diffused light in the direction of the first diffusion axis different from the extent of spread of diffused light in the direction of the second diffusion axis similarly to the embodiment that has been described so far, and the rectangular cross section as illustrated in FIG. 8. Therefore, even when the light diffusing element 170 is used, it is possible to obtain the operational effect unique to the present invention described in § 5.

Incidentally, it is possible to use a hologram having a function of forming a reproduction image of a rectangular surface (a rectangular surface having a certain aspect ratio) at an arbitrary position in a three-dimensional space, for example, as the individual hologram recorded in each elemental diffractive optical area. Such an individual hologram can be also prepared by an optical process (for example, a process of arranging a diffusion plate having a rectangular surface at a predetermined position in the three-dimensional space and recording an interference fringe between object light and predetermined reference light from the rectangular surface of the diffusion plate in a photosensitive medium). For practical use, it is preferable to prepare the individual hologram by recording an interference fringe obtained by calculation of a computer in a physical structure using a CGH method.

An advantage of the modification using the elemental diffractive optical area is that a scanning direction of the scanning member 120 and a moving direction of the drawing spot D on the illumination target surface S can be set completely independently. For example, when scanning is performed along the path of the scan lines SL1, SL2, and SL3 in the basic embodiment illustrated in FIG. 4, the diffused light spot G formed for the illumination optical system 140 moves along the path of the scan lines SL1, SL2, and SL3 as illustrated in FIG. 10, and the drawing spot D on the illumination target surface S also moves along the same path. This is because the diffraction pattern having a predetermined diffusion characteristic is recorded over the entire surface of the light diffusing element 130 illustrated in FIG. 4, and thus, a direction of emitted diffracted light also changes in a direction according to a change in beam scanning if an incident position and an incident angle of incident light change in response to the beam scanning.

Even in the modification using the elemental diffractive optical area illustrated in FIG. 21, the example in which the drawing spot D is set to move according to the scanning direction has been described for convenience of the description. However, positions of hologram reproduction images can be arbitrarily set since the independent individual holograms are recorded in the individual elemental diffractive optical areas 171 illustrated in FIG. 21. For example, it is possible to set the position such that the drawing spot D2 is formed by the diffracted light from the elemental diffractive optical area 171 or the drawing spot D3 is formed by the diffracted light from the elemental diffractive optical area 172 in FIG. 21. In short, at which position the drawing spot D is to be formed by the diffracted light from which elemental diffractive optical area can be arbitrarily determined at the time of design.

Since the scanning direction of the incident light with respect to the light diffusing element 170 and the moving direction of the drawing spot D on the illumination target surface S can be set completely independently in the modification using the elemental diffractive optical area in this manner, it is also possible to move the drawing spot D in the Y-axis direction, move the drawing spot D in a zigzag manner, or move the drawing spot D to a completely random position while scanning the light beam in the X-axis direction, for example. This characteristic can greatly contribute to achieving the object of the present invention, that is, to securing the safety for coherent light.

That is, when a movement path of the drawing spot D on the illumination target surface S follows a predetermined locus corresponding to a scanning path of a light beam, light from the light source continuously enters eyes of a human who gazes at the light source direction. On the other hand, if the method of moving the drawing spot D in a zigzag manner or to a random position is adopted as described above, the illumination direction can be dispersed, and thus, it becomes possible to disperse light from the light source that enters the human eyes and to improve safety.

In short, it is possible to record the diffraction pattern having a predetermined diffraction characteristic in each elemental diffractive optical area such that the scanning path of the light beam by the scanning member 120 is different from the movement path of the drawing spot D on the illumination target surface S in the modification using the elemental diffractive optical area, and accordingly, it is possible to disperse the light from the light source that enters the human eyes and improve the safety.

<6.5 Modification Regarding Direction of Anisotropic Diffusion>

The embodiments that have been described so far assume that the present invention is used as the in-vehicle illumination device, and aim to eliminate the blurring of the contour line formed at the end of the illumination area 20 formed on the road surface in relation to the Y-axis direction. As described in § 5, it is extremely important to take the measure against the blurring of the contour lines formed at the ends in the Y-axis direction (a back portion and a front portion of the illumination area 20 when the road surface is viewed from the driver of the vehicle as illustrated in FIG. 1) since the illumination area 20 is stretched in the Y-axis direction in the case of the illumination device used the an environment where the irradiation angle θ with respect to the illumination target surface S is extremely small, such as the in-vehicle illumination device.

However, the illumination device according to the present invention is not necessarily limited to the application to the in-vehicle illumination device, and can be usable for an application of forming an illumination area having a predetermined shape on a wall surface of a building, for example. Therefore, there may be a case where the measure against blurring of the contour line formed at the end in the X-axis direction is more important than the measure against the contour line formed at the end in the Y-axis direction depending on a use environment. In addition, even in the case of being used in the in-vehicle illumination device as illustrated in FIG. 1, there may be a case where it is more important to suppress blurring of an edge portion at ends (left and right ends) in the X-axis direction than blurring at the ends in the Y-axis direction (the back portion and the front portion) due to the nature of a figure or a character presented as the illumination area 20.

In such a case, it is sufficient to use a light diffusing element from which diffused light having a cross-sectional shape obtained by rotating the figure illustrated in FIG. 8 by 90° is emitted. That is, although the light diffusing element that can obtain the first-order diffracted light with the angular spatial distribution represented by the horizontally long rectangle is used in the embodiments that have been described so far as illustrated in the upper right frame of FIG. 7, instead, a light diffusing element capable of obtaining first-order diffracted light having an angular spatial distribution represented by a vertically long rectangle may be used. Then, it is possible to perform the illumination with the measure against the blurring of the contour line formed at the end in the X-axis direction, instead of the measure against the blurring of the contour line formed at the end in the Y-axis direction.

It is a matter of course that it is also possible to use a light diffusing element that emits diffused light having a cross-sectional shape obtained by rotating the figure illustrated in FIG. 8 by an arbitrary angle when it is necessary to take a measure against blurring of a contour line at a specific portion of the illumination area 20 in a special illumination environment.

The main point of the present invention is that the light diffusing element 130 performs the anisotropic diffusion is performed such that the extent of spread of diffused light in the first diffusion axis direction is different from the extent of spread of diffused light in the second diffusion axis direction when the first diffusion axis and the second diffusion axis are defined on the light emitting surface of the light diffusing element 130. In the embodiments that have been described so far, the first diffusion axis is set as the direction parallel to the X axis, the second diffusion axis is set as the direction parallel to the Z axis or the Z' axis, and the extent of spread of diffused light in the first diffusion axis direction is set to be larger than the extent of spread of diffused light in the second diffusion axis direction. Conversely, the extent of spread of diffused light in the second diffusion axis direction may be set to be larger than the extent of spread of diffused light in the first diffusion axis direction. In addition, the first diffusion axis and the second diffusion axis can be set as arbitrary directions as long as the directions intersect each other, and the both are not necessarily orthogonal to each other.

<6.6 Modification Using Multiple Lenses>

Figure 22:
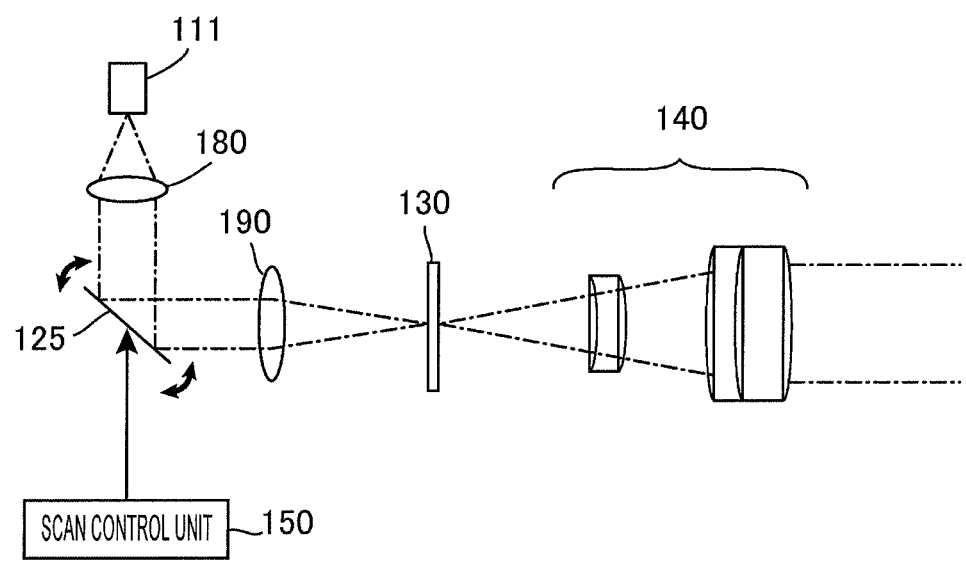
FIG. 22 is a plan view (a part of which is a block diagram) illustrating an illumination device 600 using multiple lenses according to a modification of the present invention.

An illumination device 600 illustrated in FIG. 22 is a modification using the reflection scanning member 125 similarly to the illumination device 500 illustrated in FIG. 20, but is an example in which the device is configured using more lenses. That is, in the illumination device 600, a collimator lens 180 is arranged between the light source 111 and the reflection scanning member 125, and a condenser lens 190 is arranged between the reflection scanning member 125 and the light diffusing element 130. In addition, the illumination optical system 140 is configured using a lens group including a plurality of lenses as illustrated in the drawing.

The light source 111 used in this modification is of a type that causes laser light to be diverged from a point light source, and coherent light from the light source 111 is emitted not as a fine light beam but as divergent light spreading in a conical shape from a position of the point light source. The collimator lens 180 serves a role of collimating the coherent light from the point light source. Therefore, parallel light (having a circular cross section) having a width is incident onto the reflection scanning member 125 as illustrated in the drawing. The reflection scanning member 125 is configured by a movable mirror that rotates as indicated by an arrow in the drawing under the control of the scan control unit 150, and parallel light reflected by this movable mirror passes through the condenser lens 190 and is emitted to an incident surface of the light diffusing element 130.

Since the incident surface of the light diffusing element 130 is arranged at a rear focal position of the condenser lens 190, the coherent light collected by the condenser lens 190 forms a minute beam spot B on the incident surface of the light diffusing element 130. A point that the beam spot B is scanned on the light diffusing element 130 by the scanning member 125 is similar to the basic embodiment that has been described so far. In addition, a point that the coherent light emitted to the light diffusing element 130 as the beam spot B is anisotropically diffused to be directed to the illumination optical system 140 is also similar to the basic embodiment that has been described so far. In this modification, the illumination optical system 140 is constituted by the plurality of lenses, but the point that this illumination optical system 140 serves the role of the collimator lens is also similar to the basic embodiment that has been described so far, and illumination light emitted from the illumination optical system 140 is directed to the illumination target surface S as parallel light.

§ 7. Summary of Basic Concepts of Present Invention

Finally, the basic concepts of the present invention are summarized to describe the main points thereof. The present invention provides the illumination device capable of forming the clear illumination area with suppressed blurring on the illumination target surface while securing the safety for coherent light, and has the following various aspects.

A basic aspect of the present invention relates to an illumination device including: a light source that emits coherent light; a light diffusing element that anisotropically diffuses the incident coherent light; a scanning member that scans the light diffusing element with the coherent light emitted from the light source; and n illumination optical system that guides the anisotropically diffused coherent light to an area to be illuminated.

According to one aspect of the present invention, the illumination optical system is a collimator that collimates the anisotropically diffused coherent light in the above-described illumination device.

According to one aspect of the present invention, the light diffusing element is arranged at a front focal position of the illumination optical system in the above-described illumination device.

According to one aspect of the present invention, the light diffusing elemental diffuses the coherent light scanned by the scanning member in a uniaxial direction in the above-described illumination device.

According to one aspect of the present invention, the light diffusing element diffuses the coherent light scanned by the scanning member in a normal direction of a surface passing through a normal direction of the area to be illuminated and an optical axis center direction of the illumination optical system in the above-described illumination device.

According to one aspect of the present invention, the light diffusing element diffuses coherent light in a predetermined direction with a size larger than a size of a beam spot of the coherent light from the scanning member incident on the light diffusing element and diffuses coherent light with the size of the beam spot in a direction intersecting the predetermined direction in the above-described illumination device.

According to one aspect of the present invention, the illumination optical system illuminates an illumination range such that at least one of an illumination position, an illumination shape, and an illumination size in the area to be illuminated differs depending on an incident position of the coherent light, diffused by the light diffusing element, onto the illumination optical system in the above-described illumination device.

According to one aspect of the present invention, the illumination optical system is a lens, a concave mirror, or a curved mirror in the above-described illumination device.

According to one aspect of the present invention, the light diffusing element is a diffractive optical element or a holographic optical element in the above-described illumination device.

In this manner, the illumination target surface S is illuminated by collimating the coherent light from the light diffusing element 130 that performs the anisotropic diffusion using the optical illumination system 140, such as the lens, in the illumination device according to the embodiments of the present invention, and thus, it is possible to suppress an illumination blur in the illumination area LA formed on the illumination target surface S and to clearly display an illumination pattern having an arbitrary shape. Thus, the illumination pattern can be correctly recognized even when an observer near the illumination area LA observes the illumination pattern.

In addition, the light diffusing element 130 greatly diffuses the coherent light from the scanning member 120 in the predetermined direction, and thus, it is possible to realize design to prevent coherent light with a light intensity that hurts eyes from entering the eyes of the observer even if the observer looks at the light source 110 side from the illumination area LA side, and it is possible to improve the safety for coherent light.

Although the present invention has been described based on several embodiments as above, the aspects of the present disclosure are not limited to the individual embodiments described above, and also include various modifications that can be conceived by those skilled in the art, and the effects of the present disclosure are not limited to the above-described content. That is, various additions, modifications, and partial deletions can be made in a scope not departing from the conceptual idea and gist of the present disclosure derived from the content defined in the claims and their equivalents.

INDUSTRIAL APPLICABILITY

The illumination device according to the present invention can be widely used for applications in which an illumination area having an arbitrary shape is formed on a predetermined illumination target surface to perform illumination. In particular, the illumination device according to the present invention is most suitable for use in an illumination environment where an angle between an optical axis of illumination light and an illumination target surface is small, such as an application of illuminating a road surface of a road.

REFERENCE SIGNS LIST 10 road surface (illumination target surface)
20 illumination area (illumination pattern)
30 pedestrian
40 vehicle
100, 100' illumination device
110 light source
110R red light source
110G green light source
110B blue light source
111 light source
115R red light source lens
115G green light source lens
115B blue light source lens
120 scanning member (transmission type)
120R red scanning member
120G green scanning member
120B blue scanning member
125 scanning member (reflection type)
130 light diffusing element
130R red light diffusing element
130G green light diffusing element
130B blue light diffusing element
131 grid line
135 light diffusing element
140 illumination optical system (collimator lens)
140R red illumination optical system
140G green illumination optical system
140B blue illumination optical system
150 scan control unit
155 integrated scan control unit
160 light lighting control unit
170 light diffusing element
171 to 173 elemental diffractive optical area
180 collimator lens
190 condenser lens
200 illumination device
210 light source
220 scanning member
230 phosphor
240 illumination optical system
250 scan control unit
300 illumination device with light lighting control function
400 color illumination device
500 illumination device using reflection scanning member
600 illumination device using multiple lenses
A1 first diffusion axis
A2 second diffusion axis
B beam spot
C optical axis (central axis of illumination light)
CL left oblique contour line
CR right oblique contour line
D, D1 to D4, D(t2) to D(t23) drawing spot
E diffracted light distribution area
F focus
f focal length
G, G(t2) to G(t32) diffused light spot
H pixel
J(t2) diffused light spot
K1 to K4, K(t2) drawing spot
L110 light beam
L120, L120(t1) to L120(t3) scanning beam
L125 scanning beam
L130, L130(t2) to L130(t31) diffused light (anisotropic diffusion)
L135(t2) diffused light (isotropic diffusion)
L140, L140(t2) to L140(t31) illumination light
LA illumination area
Lin incident light
Lout emitted light M virtual projection plane
Np normal line to point P on vertically arranged light diffusing element
Np' normal line to point P on obliquely arranged light diffusing element
O origin of coordinate system
P, P(t1) to P(t32) origin of incident point/angular spatial distribution graph
Q one point on space
R distribution point on angular spatial distribution map
S illumination target surface (XY plane)
SA scan area
SL, SL1 to SL3 scan line
t cumulative irradiation time of illumination light
t1 to t32 scanning time point
V gaze direction
W widths of drawing spots K1 to K4 in Y-axis direction
X, Y, Z each coordinate axis of three-dimensional orthogonal coordinate system
y1 to y7 Y-coordinate value
Z' tilt axis
xp, yp, zp coordinate value of point P in three-dimensional orthogonal coordinate system
xq, yq, zq coordinate value of point Q in three-dimensional orthogonal coordinate system
δ widths of drawing spots D1 to D4
θ irradiation angle to illumination target surface
θH first direction displacement angle
θV second direction displacement angle
ξ tilt angle
φ1 first diffusion angle
φ2 second diffusion angle

The invention claimed is:

1. An illumination device comprising:
   a light source that emits a coherent light beam;
   a scanning member that scans the light beam;
   a light diffusing element that receives a scanning beam scanned by the scanning member and diffuses the scanning beam and emits diffused light;
   an illumination optical system that guides the diffused light to an illumination target surface; and
   a scan control unit that controls scanning of the light beam by the scanning member such that incident points of the scanning beam to the light diffusing element draw predetermined loci, wherein
   when a first diffusion axis and a second diffusion axis are defined on a light emitting surface of the light diffusing element, the light diffusing element performs anisotropic diffusion such that an extent of a spread of the diffused light in a direction of the first diffusion axis is different from an extent of a spread of the diffused light in a direction of the second diffusion axis,
   the diffused light emitted from the light diffusing element passes through the illumination optical system and forms a drawing spot on the illumination target surface at each scanning time point,
   a drawing is performed by moving the drawing spot on the illumination target surface to form an illumination area having a predetermined shape under the control of the scanning of the light beam,
   the first diffusion axis and the second diffusion axis are orthogonal to each other, and a cross section of the diffused light orthogonal to a central axis of the diffused light is rectangular,
   when an XYZ three-dimensional orthogonal coordinate system is defined, the illumination target surface is set on an XY plane, the light emitting surface of the light diffusing element is located on a plane parallel to an XZ plane, the first diffusion axis is parallel to an X axis, the second diffusion axis is parallel to a Z axis, and
   the light diffusing element performs anisotropic diffusion such that the diffused light, emitted from the light emitting surface is directed toward the illumination target surface and a cross section when the diffused light is cut: along a plane orthogonal to a central axis of the diffused light forms a rectangle having two sides parallel to the X axis as long sides and the other two sides as short sides.

2. The illumination device according to claim 1, wherein
   when the XYZ three-dimensional orthogonal coordinate system is defined and a Z' axis, obtained by rotating the Z axis by a predetermined tilt angle with the X axis as a rotation axis, is defined, the illumination target surface is set on the XY plane, the light emitting surface of the light diffusing element is located on a plane parallel to an XZ' plane, the first diffusion axis is parallel to the X axis, and the second diffusion axis is parallel to the Z' axis, and
   the light diffusing element performs anisotropic diffusion such that the diffused light emitted from the light emitting surface is directed toward the illumination target surface and a cross section when the diffused light is cut along a plane parallel to the XZ' plane forms a rectangle having two sides parallel to the X axis as long sides and two sides parallel to the Z' axis as short sides.

3. The illumination device according to claim 1, wherein
   the illumination optical system comprises a collimator lens, and the light emitting surface of the light diffusing element is arranged at a front focal position of the collimator lens.

4. The illumination device according to claim 1, wherein
   the scanning member comprises: a transmission scanning body that emits light incident on a first surface from a second surface; and a scanning mechanism that rotates the transmission scanning body about two axes to perform scanning,
   the light beam from the light source is transmitted through the transmission scanning body, and the transmitted light beam is directed to the light diffusing element as the scanning beam, and
   the scan control unit performs scan control to two-dimensionally change incident points of the scanning beam to the light diffusing element.

5. The illumination device according to claim 1, wherein
   the scanning member comprises: a reflection scanning body that has a reflective surface that reflects and emits incident light, and a scanning mechanism that scans by rotating the reflection scanning body about two axes,
   the light beam from the light source is reflected from the reflection scanning body, and the reflected light beam is directed to the light diffusing element as the scanning beam, and
   the scan control unit performs scan control to two-dimensionally change incident points of the scanning beam to the light diffusing element.

6. The illumination device according to claim 1, wherein
   the scan control unit performs scanning at a speed at which the illumination area formed on the illumination target surface is visually recognized as a continuous area by human eyes.

7. The illumination device according to claim 1, further comprising a light lighting control unit that controls turning on and off of the light source, wherein the control of turning on and off by the light lighting control unit is performed in conjunction with the scan control by the scan control unit, and the illumination area having the predetermined shape is formed by an assembly of drawing spots when the light source is turned on.

8. A color illumination device comprising three sets of the illumination device according to claim 1, wherein a light source of a first illumination device generates a red light beam, a light source of a second illumination device generates a green light beam, and a light source of a third illumination device generates a blue light beam, a light diffusing element of the first illumination device forms a red illumination area by red diffused light, a light diffusing element of the second illumination device forms a green illumination area by green diffused light, and a light diffusing element of the third illumination device forms a blue illumination area by blue diffused light, and a color illumination area of a predetermined color is formed in an overlapping portion of the red illumination area, the green illumination area, and the blue illumination area.

9. An illumination device comprising:

a light source that emits a coherent light beam;

a scanning member that scans the light bean;

a light diffusing element that receives a scanning beam scanned by the scanning member and diffuses the scanning beam and emits diffused light;

an illumination optical system that guides the diffused light to an illumination target surface; and a scan control unit that controls scanning of the light beam by the scanning member such that incident points of the scanning beam to the light diffusing element draw predetermined loci, wherein when a first diffusion axis and a second diffusion axis are defined on a light emitting surface of the light diffusing element, the light diffusing element performs anisotropic diffusion such that an extent of a spread of the diffused light in a direction of the first diffusion axis is different from an extent of a spread of the diffused light in a direction of the second diffusion axis, the diffused light emitted from the light diffusing element passes through the illumination optical system and forms a drawing spot on the illumination target surface at each scanning time point, a drawing is performed by moving the drawing spot on the illumination target surface to form an illumination area having predetermined shape under the control of the scanning of the light beam, the light diffusing element is configured using a diffractive optical element or a holographic optical element, a diffraction grating or an interference fringe is recorded in each portion of the light diffusing element such that diffracted light having an angular spatial distribution of a predetermined first-order diffracted light intensity is emitted as the diffused light when incident light having a predetermined incident angle is applied, and when a displacement angle of diffracted light with respect to incident light at a predetermined incident point is expressed by a first direction displacement angle indicating a displacement in a direction of the first diffusion axis and a second direction displacement angle indicating a displacement in a direction of the second diffusion axis and a distribution graph having the first direction displacement angle as an abscissa axis, the second direction displacement angle as an ordinate axis, and a point at which the first direction displacement angle equals to 0 and the second direction displacement angle equals to 0 as an origin is defined, the angular spatial distribution of the first-order diffracted light intensity is expressed by a diffracted light distribution area formed of a horizontally long rectangle that is bilaterally symmetrical with the ordinate axis as a symmetry axis on the distribution graph.

10. The illumination device according to claim 9, wherein when an XYZ three-dimensional orthogonal coordinate system is defined, the illumination target surface is set on an XY plane, the light emitting surface of the light diffusing element is located on a plane parallel to an XZ plane, the first diffusion axis is parallel to an X axis, and the second diffusion axis is parallel to a Z axis, and an angular spatial distribution of a first-order diffracted light intensity for each portion of the light diffusing element is expressed by a diffracted light distribution area formed of a horizontally long rectangle, arranged at a position which has a predetermined ordinate value such that the diffused light is directed to the illumination target surface with an ordinate axis as a center, on a distribution graph.

11. The illumination device according to claim 9, wherein when an XYZ three-dimensional orthogonal coordinate system is defined and a Z' axis, obtained by rotating a Z axis by a predetermined tilt angle with an X axis as a rotation axis, is defined, the illumination target surface is set on an XY plane, the light emitting surface of the light diffusing element is located on a plane parallel to an XZ' plane, the first diffusion axis is parallel to the X axis, and the second diffusion axis is parallel to the Z' axis, and an angular spatial distribution of a first-order diffracted light intensity for each portion of the light diffusing element is expressed by a diffracted light distribution area formed of a horizontally long rectangle, arranged with an origin as a center, on a distribution graph.

12. The illumination device according to claim 11, wherein the light diffusing element comprises a diffractive optical element in which a diffraction grating with multiple grid lines parallel to the Z' axis arranged at a plurality of pitches is recorded in a physical structure.

13. The illumination device according to claim 9, wherein the light diffusing element comprises a holographic optical element in which each portion generates a reproduction image of a rectangular surface at a predetermined position.

14. The illumination device according to claim 13, wherein the light diffusing element is a holographic optical element in which a Computer Generated Hologram having an interference fringe obtained by calculation using a computer is recorded in a physical structure.

15. The illumination device according to claim 9, wherein the light diffusing element is a holographic optical element having a plurality of elemental diffractive optical areas, independent individual holograms are recorded respectively in the plurality of elemental diffractive optical areas, and the individual holograms have functions of emitting diffused light that forms separate drawing spots at individual positions, respectively, on the illumination target surface through the illumination optical system when receiving the scanning beam from the scanning member.

16. An illumination device comprising:
a light source that emits a coherent light beam;
a scanning member that scans the light beam;
a light diffusing element that receives a scanning beam scanned by the scanning member and diffuses the scanning beam and emits diffused light;
an illumination optical system that guides the diffused light to an illumination target surface; and
a scan control unit that controls scanning of the light beam by the scanning member such that incident points of the scanning beam to the light diffusing element draw predetermined loci, wherein
when a first diffusion axis and a second diffusion axis are defined on a light emitting surface of the light diffusing element, the light diffusing element performs anisotropic diffusion such that an extent of a spread of the diffused light in a direction of the first diffusion axis is different from an extent of a spread of the diffused light in a direction of the second diffusion axis,
the diffused light emitted from the light diffusing element passes through the illumination optical system and forms a drawing spot on the illumination target surface at each scanning time point,
a drawing is performed by moving the drawing spot on the illumination target surface to form an illumination area having a predetermined shape under the control of the scanning of the light beam, and
when a virtual projection plane orthogonal to an optical axis of the illumination optical system is defined at a front surface position of the illumination optical system, the diffused light from the light diffusing element forms a rectangular diffused light spot having a pair of long sides and a pair of short sides on the virtual projection plane at each scanning time point.

17. The illumination device according to claim 16, wherein
when an XYZ three-dimensional orthogonal coordinate system is defined, the illumination target surface is set on an XY plane, the light emitting surface of the light diffusing element is located on a plane parallel to an XZ plane, the optical axis of the illumination optical system is parallel to a central axis of the diffused light emitted from a predetermined point on the light emitting surface of the light diffusing element, the first diffusion axis is parallel to an X axis, and the second diffusion axis is parallel to a Z axis, and
when the virtual projection plane orthogonal to the optical axis of the illumination optical system is defined at the front surface position of the illumination optical system, the diffused light from the light diffusing element forms the rectangular diffused light spot having a pair of long sides parallel to the X axis and short sides formed of the other pair of sides on the virtual projection plane at each scanning time point.

18. The illumination device according to claim 16, wherein
when an XYZ three-dimensional orthogonal coordinate system is defined and a Z' axis, obtained by rotating a Z axis by a predetermined tilt angle with an X axis as a rotation axis, is defined, the illumination target surface is set on an XY plane, the light emitting surface of the light diffusing element is located on a plane parallel to an XZ' plane, the optical axis of the illumination optical system is orthogonal to the XZ' plane, the first diffusion axis is parallel to the X axis, and the second diffusion axis is parallel to the Z' axis, and
when a virtual projection plane parallel to the XZ' plane is defined at the front surface position of the illumination optical system, the diffused light from the light diffusing element forms the rectangular diffused light spot having a pair of long sides parallel to the X axis and a pair of short sides parallel to the Z' axis on the virtual projection plane at each scanning time point.

* * * * *